(12) United States Patent
Fujita et al.

(10) Patent No.: US 9,689,713 B2
(45) Date of Patent: Jun. 27, 2017

(54) ROTATION ANGLE DETECTION APPARATUS

(71) Applicant: DENSO CORPORATION, Kariya, Aichi-pref. (JP)

(72) Inventors: Toshihiro Fujita, Kariya (JP); Toshimitsu Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 2 days.

(21) Appl. No.: 15/007,862

(22) Filed: Jan. 27, 2016

(65) Prior Publication Data

US 2016/0223363 A1    Aug. 4, 2016

(30) Foreign Application Priority Data

Jan. 29, 2015 (JP) .................................. 2015-15520
Dec. 8, 2015 (JP) ................................ 2015-239283

(51) Int. Cl.
  *G01D 5/244* (2006.01)
(52) U.S. Cl.
  CPC ..... *G01D 5/24485* (2013.01); *G01D 5/24461* (2013.01)
(58) Field of Classification Search
  CPC .... G01D 5/145; G01D 5/2449; G01D 5/2013; H01L 43/08; G01R 33/0023; G01L 1/246
  USPC ....... 324/200, 207.2, 207.25, 117 H, 207.13, 324/207.14, 207.22, 219–241, 248–255, 324/378, 389, 207.21, 244, 338, 339
  See application file for complete search history.

(56) References Cited

U.S. PATENT DOCUMENTS

| | | | |
|---|---|---|---|
| 8,659,288 B2 * | 2/2014 | Harada | ................... G01B 7/30 324/207.13 |
| 8,736,256 B2 * | 5/2014 | Komasaki | .............. B82Y 25/00 324/207.21 |
| 2011/0087456 A1 | 4/2011 | Satou et al. | |

* cited by examiner

*Primary Examiner* — Melissa Koval
*Assistant Examiner* — Trung Nguyen
(74) *Attorney, Agent, or Firm* — Knobbe, Martens, Olson & Bear, LLP

(57) ABSTRACT

A rotation angle detection apparatus includes three or more sensing portions and a controller. Each sensing portion includes a main circuit unit which is a full-bridge circuit and a subsidiary circuit unit which is a full-bridge circuit. An angle calculator of the controller calculates a rotation angle on the basis of a main signal corresponding to a main positive signal and a main negative signal outputted from at least one main circuit unit and a subsidiary signal corresponding to a subsidiary positive signal and a subsidiary negative signal outputted from at least one subsidiary circuit unit. An abnormality monitoring unit compares main signals and also compares subsidiary signals outputted from different sensing portions and monitors an abnormality occurrence according to a comparison result. A rotation angle can be thus detected with high accuracy.

14 Claims, 25 Drawing Sheets

FIG. 10

| COMPARISON<br>STATE | SIGNALS 1<br>SIGNALS 2 | SIGNALS 1<br>SIGNALS 3 | SIGNALS 2<br>SIGNALS 3 | SIGNALS USED | |
|---|---|---|---|---|---|
| | | | | ANGLE CALCULATION | ABNORMALITY MONITORING |
| NORMAL | ◯ | ◯ | ◯ | SIGNALS 1 | ALL COMBINATIONS (THREE WAYS × 2) |
| SIGNALS 2 ABNORMAL | × | ◯ | × | SIGNALS 1 | SIGNALS 1: SIGNALS 3 |
| SIGNALS 3 ABNORMAL | ◯ | × | × | SIGNALS 1 | SIGNALS 1: SIGNALS 2 |
| SIGNALS 1 ABNORMAL | × | × | ◯ | SIGNALS 2 AND SIGNALS 3 | SIGNALS 2: SIGNALS 3 |

FIG. 12

| COMPARISON STATE | SIGNALS 1 SIGNALS 2 | SIGNALS 1 SIGNALS 3 | SIGNALS 2 SIGNALS 3 | SIGNALS USED | |
|---|---|---|---|---|---|
| | | | | ANGLE CALCULATION | ABNORMALITY MONITORING |
| NORMAL | ○ | ○ | — | SIGNALS 1 | SIGNALS 1 : SIGNALS 2 SIGNALS 1 : SIGNALS 3 (TWO WAYS × 2) |
| SIGNALS 2 ABNORMAL | × | ○ | — | SIGNALS 1 | SIGNALS 1 : SIGNALS 3 |
| SIGNALS 3 ABNORMAL | ○ | × | — | SIGNALS 1 | SIGNALS 1 : SIGNALS 2 |
| SIGNALS 1 ABNORMAL | × | × | ○ | SIGNALS 2 AND SIGNALS 3 | SIGNALS 2 : SIGNALS 3 |

FIG. 15

| COMPARISON / STATE | SIGNALS 1 SIGNALS 2 | SIGNALS 1 SIGNALS 3 | SIGNALS 2 SIGNALS 3 | SIGNALS USED — ANGLE CALCULATION | SIGNALS USED — ABNORMALITY MONITORING |
|---|---|---|---|---|---|
| NORMAL | ○ | ○ | ○ | SIGNALS 1 SIGNALS 2 SIGNALS 3 | ALL COMBINATIONS (THREE WAYS × 2) |
| SIGNALS 2 ABNORMAL | × | ○ | × | SIGNALS 1 AND SIGNALS 3 | SIGNALS 1 : SIGNALS 3 |
| SIGNALS 3 ABNORMAL | ○ | × | × | SIGNALS 1 AND SIGNALS 2 | SIGNALS 1 : SIGNALS 2 |
| SIGNALS 1 ABNORMAL | × | × | ○ | SIGNALS 2 AND SIGNALS 3 | SIGNALS 2 : SIGNALS 3 |

FIG. 16

| COMPARISON / STATE | cos1 cos2 | cos1 cos3 | cos2 cos3 | sin1 sin2 | sin1 sin3 | sin1 sin3 | SIGNALS USED — ANGLE CALCULATION | SIGNALS USED — ABNORMALITY MONITORING |
|---|---|---|---|---|---|---|---|---|
| NORMAL | ○ | ○ | ○ | ○ | ○ | ○ | cos1/sin1 | ALL COMBINATIONS (SIX WAYS) |
| cos2 ABNORMAL | × | ○ | × | ○ | ○ | ○ | cos1/sin1 | cos1:cos3 ALL sin COMBINATIONS (THREE WAYS) |
| cos3 ABNORMAL | ○ | × | × | ○ | ○ | ○ | cos1/sin1 | cos1:cos2 ALL sin COMBINATIONS (THREE WAYS) |
| cos1 ABNORMAL | × | × | ○ | ○ | ○ | ○ | (ave_cos2,3)/sin1 | cos2:cos3 ALL sin COMBINATIONS (THREE WAYS) |
| sin2 ABNORMAL | ○ | ○ | ○ | × | ○ | × | cos1/sin1 | ALL cos COMBINATIONS (THREE WAYS) sin1:sin3 |
| sin3 ABNORMAL | ○ | ○ | ○ | ○ | × | × | cos1/sin1 | ALL cos COMBINATIONS (THREE WAYS) sin1:sin2 |
| sin1 ABNORMAL | ○ | ○ | ○ | × | × | ○ | cos1/(ave_sin2,3) | ALL cos COMBINATIONS (THREE WAYS) sin2:sin3 |

FIG. 17

| COMPARISON STATE | cos1 cos2 | cos1 cos3 | cos2 cos3 | sin1 sin2 | sin1 sin3 | sin1 sin3 | SIGNALS USED ANGLE CALCULATION | SIGNALS USED ABNORMALITY MONITORING |
|---|---|---|---|---|---|---|---|---|
| NORMAL | ○ | ○ | — | ○ | ○ | — | cos1/sin1 | cos1:cos2,3 sin1:sin2,3 |
| cos2 ABNORMAL | × | ○ | — | ○ | ○ | — | cos1/sin1 | cos1:cos3 sin1:sin2,3 |
| cos3 ABNORMAL | ○ | × | — | ○ | ○ | — | cos1/sin1 | cos1:cos2 sin1:sin2,3 |
| cos1 ABNORMAL | × | × | ○ | ○ | ○ | — | (ave_cos2,3)/sin1 | cos2:cos3 sin1:sin2,3 |
| sin2 ABNORMAL | ○ | ○ | — | × | ○ | — | cos1/sin1 | cos1:cos2,3 sin1:sin3 |
| sin3 ABNORMAL | ○ | ○ | — | ○ | × | — | cos1/sin1 | cos1:cos2,3 sin1:sin2 |
| sin1 ABNORMAL | ○ | ○ | — | × | × | ○ | cos1/(ave_sin2,3) | cos1:cos2,3 sin2:sin3 |

FIG. 18

| COMPARISON STATE | cos1 cos2 | cos1 cos3 | cos2 cos3 | sin1 sin2 | sin1 sin3 | sin1 sin3 | SIGNALS USED | |
|---|---|---|---|---|---|---|---|---|
| | | | | | | | ANGLE CALCULATION | ABNORMALITY MONITORING |
| NORMAL | ○ | ○ | ○ | ○ | ○ | ○ | cos1 – 3/sin1 – 3 | ALL COMBINATIONS (SIX WAYS) |
| cos2 ABNORMAL | × | ○ | × | ○ | ○ | ○ | cos1,3/sin1 – 3 | cos1:cos3 ALL sin COMBINATIONS (THREE WAYS) |
| cos3 ABNORMAL | ○ | × | × | ○ | ○ | ○ | cos1,2/sin1 – 3 | cos1:cos2 ALL sin COMBINATIONS (THREE WAYS) |
| cos1 ABNORMAL | × | × | ○ | ○ | ○ | ○ | cos2,3/sin1 – 3 | cos2:cos3 ALL sin COMBINATIONS (THREE WAYS) |
| sin2 ABNORMAL | ○ | ○ | ○ | × | ○ | × | cos1 – 3/sin1,3 | ALL cos COMBINATIONS (THREE WAYS) sin1:sin2 |
| sin3 ABNORMAL | ○ | ○ | ○ | ○ | × | × | cos1 – 3/sin1,2 | ALL cos COMBINATIONS (THREE WAYS) sin1:sin3 |
| sin1 ABNORMAL | ○ | ○ | ○ | × | × | ○ | cos1 – 3/sin2,3 | ALL cos COMBINATIONS (THREE WAYS) sin2:sin3 |

ROTATION ANGLE DETECTION APPARATUS

CROSS REFERENCE TO RELATED APPLICATION

This application is based on Japanese Patent Application No. 2015-015520 filed on Jan. 29, 2015, and Japanese Patent Application No. 2015-239283 filed on Dec. 8, 2015, the disclosures of which are incorporated herein by references.

TECHNICAL FIELD

The present disclosure relates to a rotation angle detection apparatus.

BACKGROUND

A rotation angle detection apparatus according to a related art detects a rotation angle by detecting a rotating magnetic field. For example, JP 5126325 B2 discloses a rotation angle detection apparatus which calculates a rotation angle by using at least four output signals outputted from midpoints of half bridges.

An output value from a half-bridge circuit includes an offset displacement, and the rotation angle detection apparatus disclosed in JP 5126325 B2 performs offset correction in a controller. However, different from a case where output values from full-bridge circuits are used, an offset cannot be cancelled completely when affected by a phase difference caused by a manufacturing error, interconnect resistance, temperature characteristics, and the like. Also, in the event of an abnormality is occurred in partial output signals, an angle calculation is continued by using sine signals or cosine signals outputted from a single half bridge. In this case, an offset cannot be cancelled completely. Hence, detection accuracy may possibly be deteriorated in comparison with detection accuracy in a properly operating state.

SUMMARY

In view of the foregoing difficulties, it is an object of the present disclosure to provide a rotation angle detection apparatus which enables high accuracy detection of a rotation angle.

According to a first aspect of the present disclosure, a rotation angle detection apparatus includes three or more sensing portions and a controller. Each of the three or more sensing portions includes a main circuit unit and a subsidiary circuit unit. The main circuit unit is provided by a full bridge circuit and outputs a main positive signal and a main negative signal as output signals, the main positive signal corresponds to a rotating magnetic field which changes corresponding to a rotation of a detection target, and the main negative signal has an inverted polarity relative to a polarity of the main positive signal. The subsidiary circuit unit is provided by a full bridge circuit and outputs a subsidiary positive signal and a subsidiary negative signal as output signals, the subsidiary positive signal corresponds to the rotating magnetic field which changes corresponding to the rotation of the detection target, the subsidiary positive signal has a different phase from the main positive signal, and the subsidiary negative signal has an inverted polarity relative to a polarity of the subsidiary positive signal.

The controller includes an angle calculator and an abnormality monitoring unit. The angle calculator calculates a rotation angle of the detection target based on a main signal and a subsidiary signal, the main signal corresponds to at least one of the main positive signal or the main negative signal outputted from the main circuit unit, and the subsidiary signal corresponds to at least one of the subsidiary positive signal or the subsidiary negative signal outputted from the subsidiary circuit unit. The abnormality monitoring unit monitors an abnormality occurrence by comparing the corresponding output signals outputted from the three or more sensing portions.

In the present disclosure, three or more sensing portions each having two full-bridge circuits which output signals out of phase with each other enable determination of an abnormality by a relatively easy calculation, such as calculating a difference between the corresponding signals. In addition, the main circuit unit and the subsidiary circuit unit are provided by full-bridge circuits. Thus, offsets of signals outputted from the respective circuit portions can be cancelled. With this configuration, even in a case where an angle calculation is continued by using normal signals in a situation where an abnormality is occurred in partial signals, a rotation angle can be detected with high accuracy. Herein, the partial signals may be a single signal or more than one signal. Further, even when partial main signals become abnormal, abnormality monitoring can be continued by comparing the remaining normal main signals. Herein, the partial main signals may be a single main signal or more than one main signal. The same applies to the subsidiary signals.

BRIEF DESCRIPTION OF THE DRAWINGS

The above and other objects, features and advantages of the present disclosure will become more apparent from the following detailed description made with reference to the accompanying drawings. In the drawings:

FIG. 10 is a diagram showing angle calculation and abnormality monitoring according to the first embodiment of the present disclosure;

FIG. 12 is a diagram showing angle calculation and abnormality monitoring according to the second embodiment of the present disclosure;

FIG. 15 is a diagram showing angle calculation and abnormality monitoring according to a fifth embodiment of the present disclosure;

FIG. 16 is a diagram showing angle calculation and abnormality monitoring according to a sixth embodiment of the present disclosure;

FIG. 17 is a diagram showing angle calculation and abnormality monitoring according to a seventh embodiment of the present disclosure;

FIG. 18 is a diagram showing angle calculation and abnormality monitoring according to an eighth embodiment of the present disclosure;

DETAILED DESCRIPTION

Figure 1:
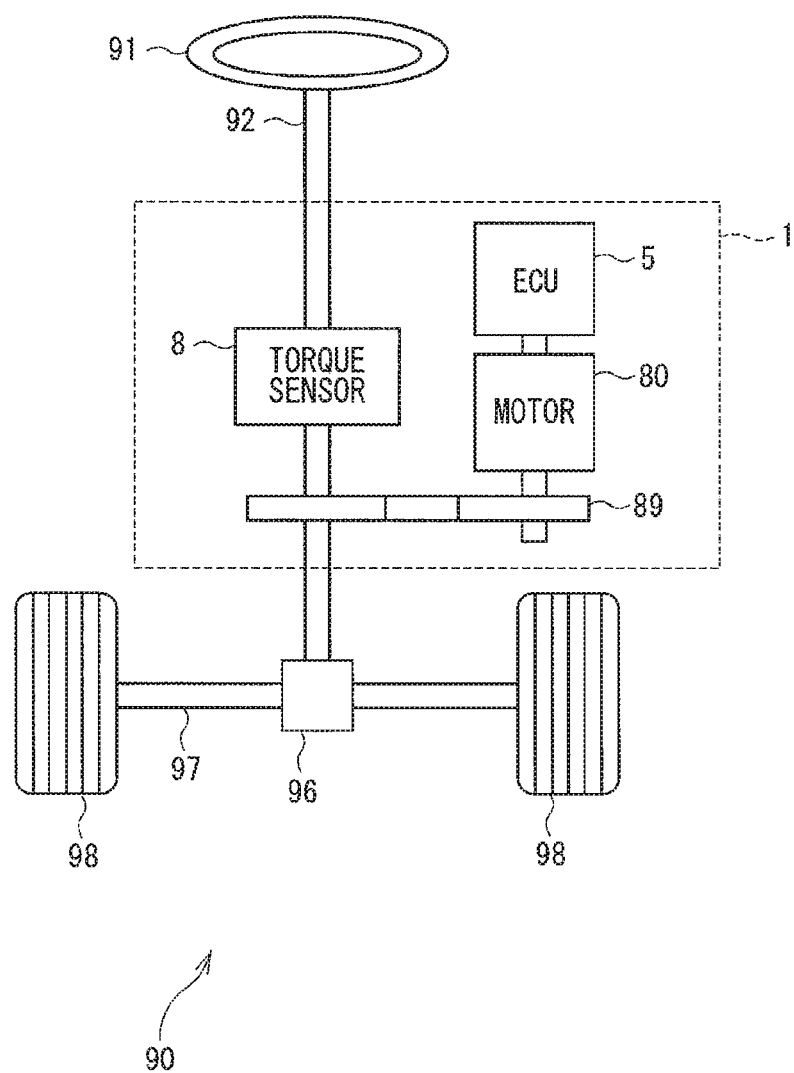
FIG. 1 is a diagram schematically showing a configuration of an electric power steering system according to a first embodiment of the present disclosure.

The following will describe a rotation angle detection apparatus according to the present disclosure with reference to the accompanying drawings. In the following embodiments, substantially same or equal configurations are labeled with same reference numerals and a repeated description will be omitted.

First Embodiment

The following will describe a rotation angle detection apparatus according to a first embodiment of the present disclosure with reference to FIG. 1 through FIG. 10.

Figure 2:
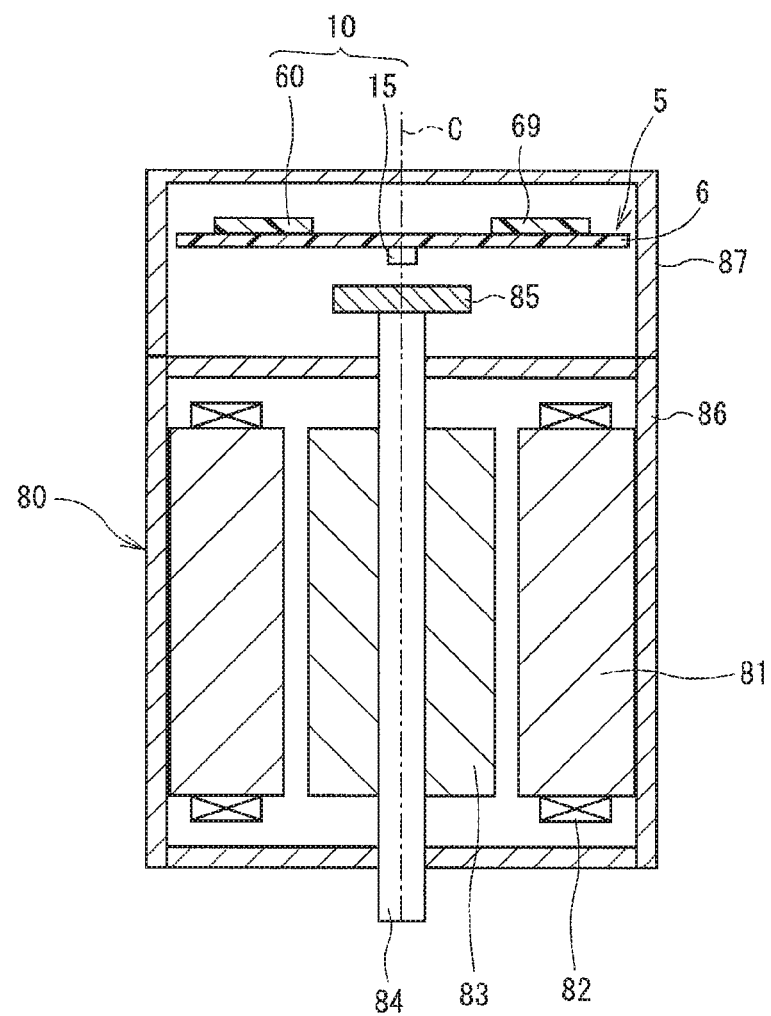
FIG. 2 is a diagram showing a sectional view of a motor according to the first embodiment of the present disclosure.
Figure 3:
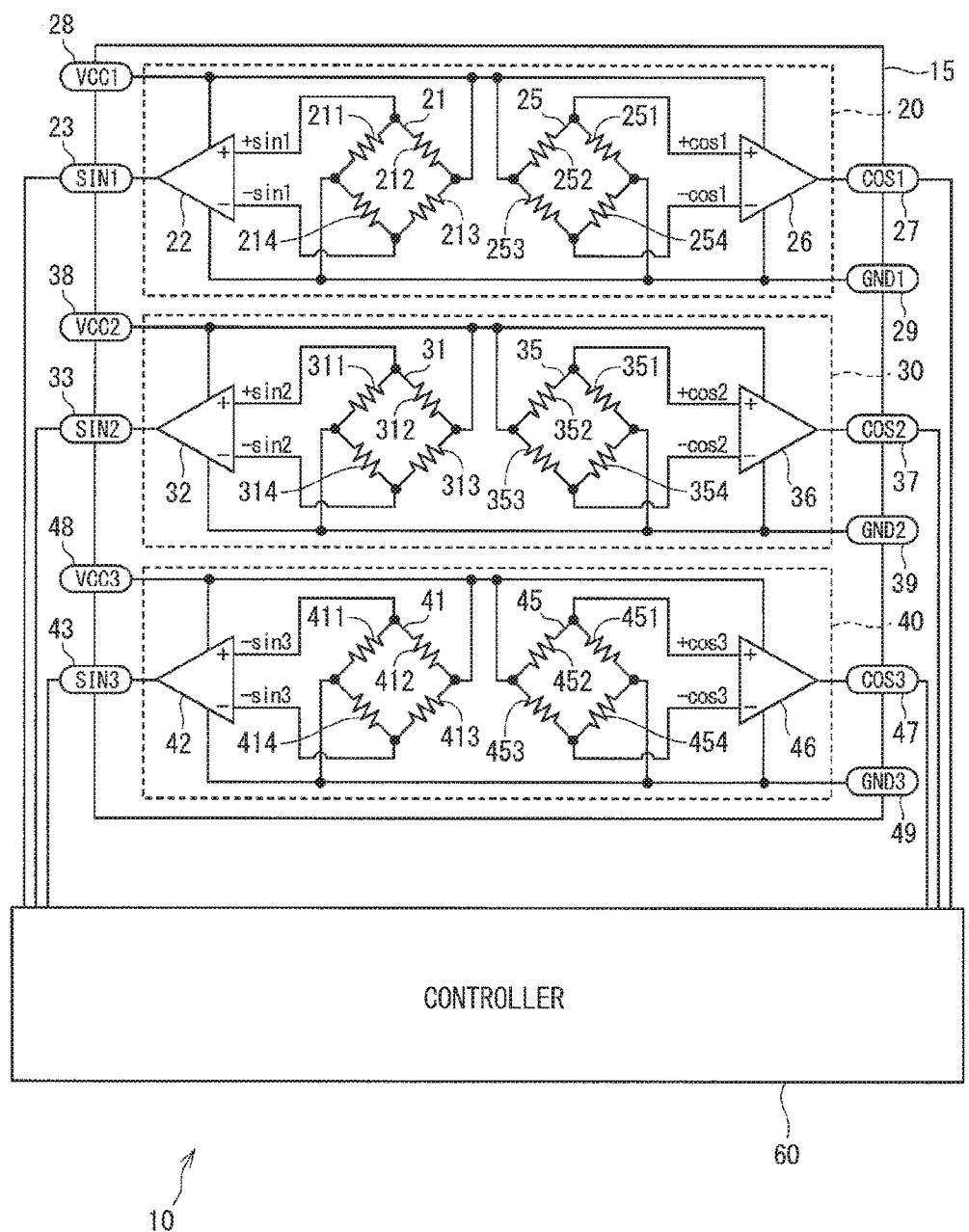
FIG. 3 is a circuit diagram showing a rotation angle detection apparatus according to the first embodiment of the present disclosure.

As are shown in FIG. 1 through FIG. 3, a rotation angle detection apparatus 10 according to the first embodiment of the present disclosure includes a sensor unit 15 and a controller 60. The rotation angle detection apparatus 10 is used in an electric power steering apparatus 1 which assists a driver of a vehicle with steering operations.

FIG. 1 shows an overall configuration of a steering system 90 including the electric power steering apparatus 1. The steering system 90 includes a steering wheel 91 as a steering member, a steering shaft 92, a pinion gear 96, a rack shaft 97, wheels 98, the electric power steering apparatus 1 and the like.

The steering wheel 91 is connected to the steering shaft 92. The pinion gear 96 is provided at a tip end of the steering shaft 92 and meshes with the rack shaft 97. A pair of the wheels 98 are coupled to the rack shaft 97 at both ends via tie rods or the like.

When the driver rotates the steering wheel 91, the steering shaft 92 connected to the steering wheel 91 rotates. Rotational motion of the steering shaft 92 is converted to linear motion of the rack shaft 97 by the pinion gear 96, and the paired wheels 98 are steered by an angle corresponding to an amount of displacement of the rack shaft 97.

The electric power steering apparatus 1 includes a motor 80 which outputs an assistance torque to assist the driver with the rotation of the steering wheel 91, a control unit (represented as ECU in the drawing) 5 which controls a driving of the motor 80, a torque sensor 8, a reduction gear 89 which reduces rotation of the motor 80 and transmits the reduced rotation to the steering shaft 92, and the like. In short, the electric power steering apparatus 1 of the present embodiment is of so-called "a column assist type". It should be understood that the electric power steering apparatus 1 may be of so-called "a rack assist type" configured to assist driving of the rack shaft 97 by transmitting rotational motion of the motor to the rack shaft 97.

The torque sensor 8 is provided to the steering shaft 92, and the torque sensor 8 detects a steering torque inputted when the driver operates the steering wheel 91.

The motor 80 is driven with a power supply from a non-illustrated battery and rotates the reduction gear 89 in forward and reverse directions.

FIG. 2 schematically shows a configuration of the motor 80. The motor 80 includes a stator 81, a rotor 83, a shaft 84, and so on.

The stator 81 is fixed to a housing 86. A coil 82 is wound around the stator 81.

The rotor 83 is a cylindrical member that rotates with the shaft 84 and is disposed inside the stator 81 close to the shaft 84 in a radial direction. The rotor 83 includes permanent magnets attached on an outward surface and has magnetic poles. The rotor 83 rotates with the shaft 84 corresponding to a rotating magnetic field induced when the coil 82 is energized.

The shaft 84 is protruded from both ends of the housing 86. A magnet 85, which functions as a detection target, is attached to one end of the shaft 84. The magnet 85 is a 2-pole magnet having a substantially disc shape, and rotates integrally with the shaft 84.

The control unit 5 includes a substrate 6, various types of electronic components mounted on the substrate 6, and a cover member 87 covering the control unit 5. The substrate 6 is fixed to a non-illustrated fixing portion of the housing 86. The sensor unit 15, the controller 60, and a power supply IC 69 are mounted on the substrate 6. The sensor unit 15 is mounted on one surface of the substrate 6. The one surface on which the sensor unit 15 is mounted is disposed close the motor 80. The sensor unit 15 is disposed at a predetermined position of the one surface so that the sensor unit 15 is opposed to the magnet 85. The controller 60 and the power supply IC 69 are mounted on another surface of the substrate 6 which is disposed on opposite side of the motor 80. The power supply IC 69 includes regulators 691 through 693 (see FIG. 6).

FIG. 3 shows a circuit configuration of the rotation angle detection apparatus 10.

The sensor unit 15 includes three sensing portions 20, 30, 40, and the sensor unit 15 is provided as a single packaged module. The three sensing portions 20, 30, 40 have similar configurations. Thus, the configuration of the sensing portion 20 will be described as a representative.

The first sensing portion 20 includes a sine circuit unit 21, a sine differential amplifier 22, a cosine circuit unit 25, and a cosine differential amplifier 26.

The sine circuit unit 21 is a sine signal output circuit provided by a full-bridge circuit in which four magnetoresistive elements 211 through 214 are connected and which has variable impedance dependent on a rotating magnetic field that varies with rotation of the magnet 85. A first positive sine signal is outputted from a connection point between the magnetoresistive elements 211 and 212 and a first negative sine signal is outputted from a connection point between the megnetoresitive elements 213 and 214. The first negative sine signal has a polarity, which is inverted from a polarity of the first positive sine signal. The first positive sine signal is inputted into a plus input terminal of the sine differential amplifier 22 and the first negative sine signal is inputted into a minus input terminal of the sine differential amplifier 22.

The sine differential amplifier 22 amplifies a difference between the first positive sine signal and the first negative sine signal. A first sine signal, which is an outcome of differential amplification in the sine differential amplifier 22, is outputted from the sine differential amplifier 22 to the controller 60 through a first sine signal output terminal 23. The first sine signal is a signal based on the first positive sine signal and the first negative sine signal.

The cosine circuit unit 25 is a cosine signal output circuit provided by a full-bridge circuit in which four magnetoresistive elements 251 through 254 are connected and which has variable impedance dependent on a rotating magnetic field that varies with rotation of the magnet 85. A first positive cosine signal is outputted from a connection point between the magnetoresistive elements 251 and 252 and a first negative cosine signal is outputted from a connection point between the magnetoresistive elements 253 and 254. The first negative cosine signal has a polarity, which is inverted from a polarity of the first positive cosine signal. The first positive cosine signal is inputted into a plus input terminal of the cosine differential amplifier 26 and the first negative cosine signal is inputted into a minus input terminal of the cosine differential amplifier 26.

The cosine differential amplifier 26 amplifies a difference between the first positive cosine signal and the first negative cosine signal. A first cosine signal, which is an outcome of differential amplification in the cosine differential amplifier 26, is outputted from the differential amplifier 26 to the controller 60 through a first cosine signal output terminal 27. The first cosine signal is a signal based on the first positive cosine signal and the first negative cosine signal.

The sine circuit unit 21, the cosine circuit unit 25, and the differential amplifies 22 and 26 are connected to the first regulator 691 through a first feed terminal 28. The sine circuit unit 21, the cosine circuit unit 25, and the differential amplifies 22 and 26 are connected to ground through a first ground terminal 29.

In FIG. 3, the first positive sine signal is denoted as "+sin1", the first negative sine signal as "−sin1", the first positive cosine signal as "4-cos1", and the first negative cosine signal as "−cos1". The same applies to signals outputted from the second sensing portion 30 and signals outputted from the third sensing portion 40.

The second sensing portion 30 includes a sine circuit unit 31, a sine differential amplifier 32, a cosine circuit unit 35, and a cosine differential amplifier 36.

A second positive sine signal outputted from a connection point between magnetoresistive elements 311 and 312 and a second negative sine signal outputted from a connection point between magnetoresistive elements 313 and 314 are inputted into the sine differential amplifier 32, and a difference between the two input signals is amplified. A second sine signal, which is an outcome of differential amplification in the sine differential amplifier 32, is outputted to the controller 60 through a sine signal output terminal 33.

A second positive cosine signal outputted from a connection point between magnetoresistive elements 351 and 352 and a second negative cosine signal outputted from a connection point between magnetoresistive elements 353 and 354 are inputted into the cosine differential amplifier 36, and a difference between the two input signals is amplified. A second cosine signal, which is an outcome of differential amplification in the cosine differential amplifier 36, is outputted to the controller 60 through a cosine signal output terminal 37. The second sine signal is a signal based on the second positive sine signal and the second negative sine signal, and the second cosine signal is a signal based on the second positive cosine signal and the second negative cosine signal.

The sine circuit unit 31, the cosine circuit unit 35, and the differential amplifiers 32 and 36 are connected to the second regulator 692 through a second feed terminal 38. The sine circuit unit 31, the cosine circuit unit 35, and the differential amplifiers 32 and 36 are connected to the ground through a second ground terminal 39.

The third sensing portion 40 includes a sine circuit unit 41, a sine differential amplifier 42, a cosine circuit unit 45, and a cosine differential amplifier 46.

A third positive sine signal outputted from a connection point between magnetoresistive elements 411 and 412 and a third negative sine signal outputted from a connection point between magnetoresistive elements 413 and 414 are inputted into the sine differential amplifier 42, and a difference between the two input signals is amplified. A third sine signal, which is an outcome of differential amplification in the sine differential amplifier 42, is outputted to the controller 60 through a third sine signal output terminal 43.

A third positive cosine signal outputted from a connection point between magnetoresistive elements 451 and 452 and a third negative cosine signal outputted from a connection point between magnetoresistive elements 453 and 454 are inputted into the cosine differential amplifier 46, and a difference between the two input signals is amplified. A third cosine signal, which is an outcome of differential amplification in the cosine differential amplifier 46, is outputted to the controller 60 through a third cosine signal output terminal 47. The third sine signal is a signal based on the third positive sine signal and the third negative sine signal, and the third cosine signal is a signal based on the third positive cosine signal and the third negative cosine signal.

The sine circuit unit 41, the cosine circuit unit 45, and the differential amplifiers 42 and 46 are connected to the third regulator 693 through a third feed terminal 48. The sine circuit unit 41, the cosine circuit unit 45, and the differential amplifiers 42 and 46 are connected to the ground through a third ground terminal 49.

Figure 4:
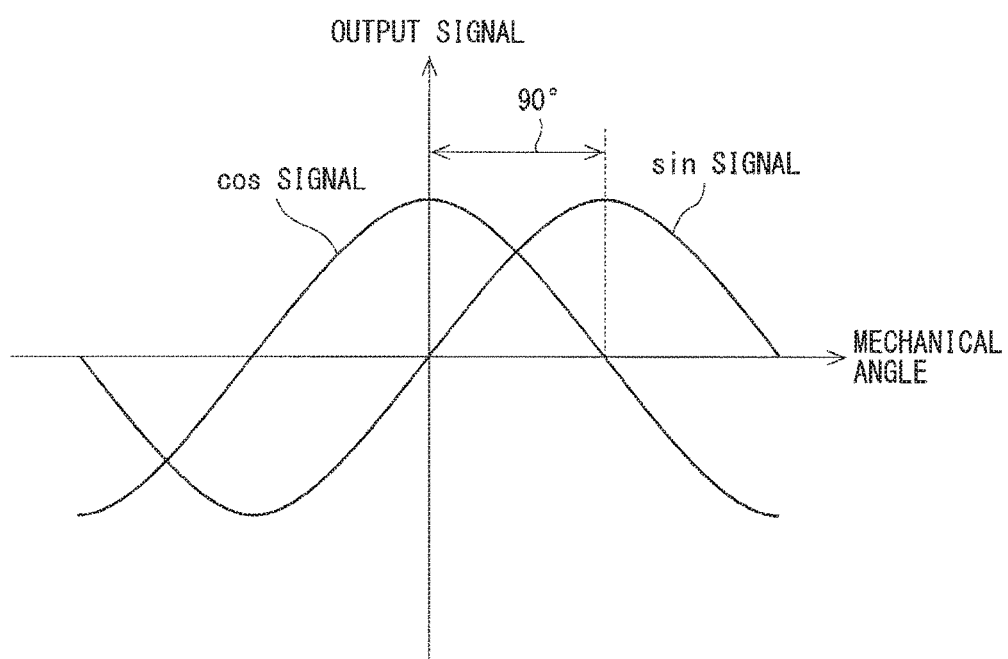
FIG. 4 is a diagram showing a sine signal and a cosine signal according to the first embodiment of the present disclosure.

As is shown in FIG. 4, the first sine signal, the second sine signal, and the third sine signal (denoted as "sin SIGNAL" in the drawing) are signals in phase with one another and have equal amplitudes. The first cosine signal, the second cosine signal, and the third cosine signal (denoted as "cos SIGNAL" in the drawing) are also signals in phase with one another and have equal amplitudes. The first sine signal, the second sine signal, and the third sine signal are 90° out of phase with the first cosine signal, the second cosine signal, and the third cosine signal.

In the present embodiment, assume that the first positive sine signal, the first negative sine signal, the second positive sine signal, the second negative sine signal, the third positive sine signal, the third negative sine signal, the first positive cosine signal, the first negative cosine signal, the second positive cosine signal, the second negative cosine signal, the third positive cosine signal, and the third negative cosine signal have equal amplitudes, and gains in the differential amplifiers 22, 26, 32, 36, 42, 46 are equal to one another.

In the present embodiment, each of the sine circuit units 21, 31, 41 corresponds to "a main circuit unit", each of the cosine circuit units 25, 35, 45 corresponds to "a subsidiary circuit unit", each of the sine differential amplifiers 22, 32, 42 corresponds to "a main differential amplifier", and each of the cosine differential amplifiers 26, 36, 46 corresponds to "a sub differential amplifier".

Each positive sine signal corresponds to "a main positive signal", each negative sine signal corresponds to "a main negative signal", each positive cosine signal corresponds to "a subsidiary positive signal", each negative cosine signal corresponds to "a subsidiary negative signal", each sine signal corresponds to "a main signal" and also corresponds to "a main differentially-amplified signal", and each cosine signal corresponds to "a subsidiary signal" and also corresponds to "a sub differentially-amplified signal". Herein, "main" is used for sine signals and "subsidiary" is used for cosine signals simply to distinguish sine signals from cosine signals and it should be understood that sine signals and cosine signals do not have a subordinate-superior relationship limited by the terms.

Figure 5A:
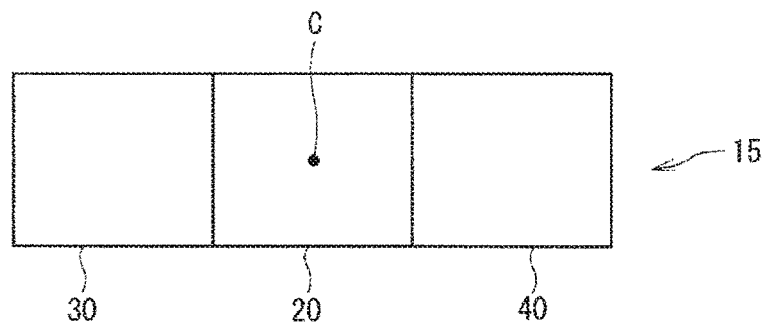
FIG. 5A through FIG. 5C are diagrams showing schematic front views of sensing portion arrangement according to the first embodiment of the present disclosure.

As is shown in FIG. 5A, the second sensing portion 30 and the third sensing portion 40 are disposed point-symmetrically with respect to a center of the first sensing portion 20. In the present embodiment, the first sensing portion 20 is disposed with a center falling on a center line C of a rotating magnetic field of the magnet 85. Hereinafter, the center line C of a rotating magnetic field of the magnet 85 is referred to simply as "a rotation center C".

Figure 5B:
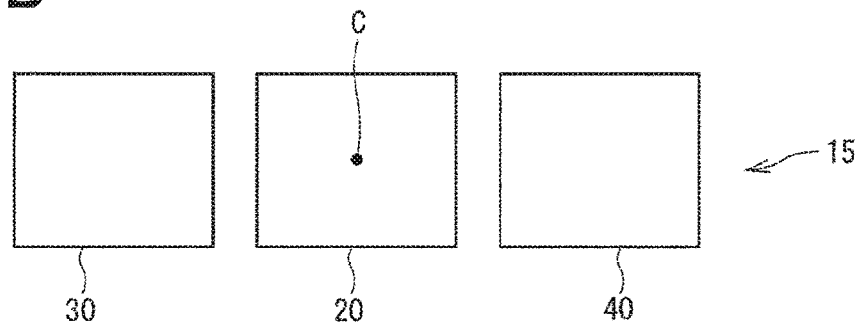
Figure 5C:
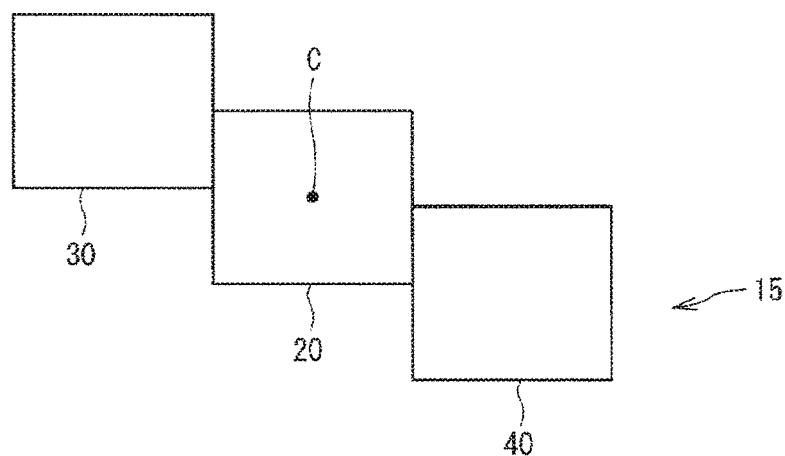

In the present embodiment, the second sensing portion 30 and the third sensing portion 40 are disposed adjacent to the first sensing portion 20 on both sides so as to have the first sensing portion 20 sandwiched therebetween. Alternatively, the sensing portions 20, 30, 40 may be spaced apart from one another as is shown in FIG. 5B or may be displaced from one another as is shown in FIG. 5C. However, because a detection error increases with a distance from the rotation center C, it is preferable to dispose the sensing portions 20, 30, 40 as close as possible.

Hereinafter, the sensing portion 20 disposed on the center line C is given as "a center sensing portion", and a combination of the sensing portions 30 and 40 disposed point-symmetrically with respect to the rotation center C is given as "symmetric sensing portion set".

Figure 6:
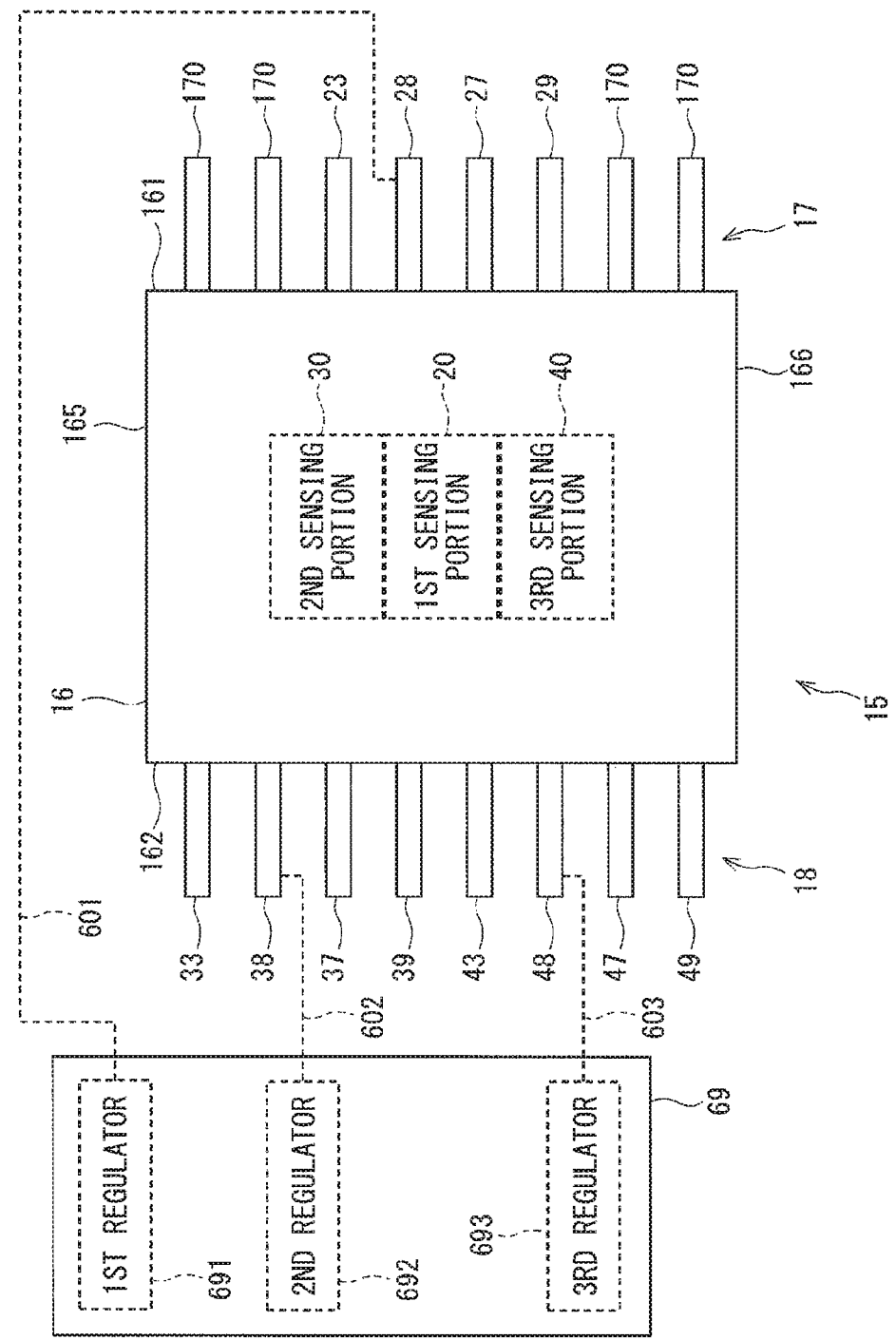
FIG. 6 is a diagram showing a terminal arrangement in a sensor unit according to the first embodiment of the present disclosure.

The following will describe a terminal arrangement of the sensor unit 15 with reference to FIG. 6. As is shown in FIG. 6, the sensing portions 20, 30, 40 are sealed by a single sealing portion 16. The sealing portion 16 is has a substantially rectangular shape. The sealing portion 16 includes a first terminal portion 17 protruding from a first side surface 161 and a second terminal portion 18 protruding from a second side surface 162 on an opposite side to the first side surface 161.

Each of the first terminal portion 17 and the second terminal portion 18 includes eight terminals.

The first terminal portion 17 includes the first sine signal output terminal 23, the first feed terminal 28, the first cosine signal output terminal 27, and the first ground terminal 29, which are sequentially arranged from a third position of one end 165. The first terminal portion 17 further two NC pins disposed close to the one end 165 and another two NC pins disposed close to the other end 166 on an opposite side to the one end 165 are NC pins 170. NC pins 170 are free pins that are not connected to an outside of the sensor unit 15.

The second terminal portion 18 includes the second sine signal output terminal 33, the second feed terminal 38, the second cosine signal output terminal 37, the second ground terminal 39, the third sine signal output terminal 43, the third feed terminal 48, the third cosine signal output terminal 47, and the third ground terminal 49, which are sequentially arranged from a side of the one end 165. In the present embodiment, the second terminal portion 18 does not include any free pin. Alternatively, the second terminal portion 18 may include one or more free pins depending on the number of terminals.

In the first terminal portion 17, the first feed terminal 28 is disposed between the first sine signal output terminal 23 and the first cosine signal output terminal 27.

The first cosine signal output terminal 27 is disposed between the first feed terminal 28 and the first ground terminal 29.

In the second terminal portion 18, the second feed terminal 38 is disposed between the second sine signal output terminal 33 and the second cosine signal output terminal 37, and the third feed terminal 48 is disposed between the third sine signal output terminal 43 and the third cosine signal output terminal 47. In addition, the second ground terminal 39 is disposed between the second cosine signal output terminal 37 and the third sine signal output terminal 43.

In the second terminal portion 18, the second cosine signal output terminal 37 is disposed between the second feed terminal 38 and the second ground terminal 39, and the third cosine signal output terminal 47 is disposed between the third feed terminal 48 and the third ground terminal 49. In addition, the third sine signal output terminal 43 is disposed between the second ground terminal 39 and the third feed terminal 48.

In the present embodiment, the signal output terminals 23, 27, 33, 37, 43, 47 are arranged in such a manner so as not be adjacent to each other by disposing terminals other than the signal output terminals 23, 27, 33, 37, 43, 47, namely, the feed terminals 28, 38, 48, or the ground terminal 39 between every two neighboring signal output terminals among 23, 27, 33, 37, 43, 47. Alternatively, the signal output terminals 23, 27, 33, 37, 43, 47 may be arranged so as not to be adjacent to each other by disposing free pins instead of the feed terminals 28, 38, 48 or the ground terminals 29, 39, 49. With this configuration, an erroneous detection caused by a short circuit between the signal output terminals can be suppressed. Even when the signal output terminal 23 and the adjacent feed terminal 28 are short-circuited, a power-supply fault abnormality can be readily determined. Also, even when the signal output terminal 27 and the adjacent ground terminal 29 are short-circuited, a ground fault abnormality can be readily determined. The same applies to the other signal output terminals.

The feed terminals 28, 38, 48, and the ground terminals 29, 39, 49 are arranged in such a manner that the respective feed terminals 28, 38, 48 and the corresponding ground terminals 29, 39, 49 are not adjacent to each other by disposing terminals other than the feed terminals 28, 38, 48 and the ground terminals 29, 39, 49, namely, the signal output terminals 27, 37, 43, 47 between every two neighboring terminals among the feed terminals 28, 38, 48 and the ground terminals 29, 39, 49. Alternatively, the feed terminals 28, 38, 48 and the ground terminals 29, 39, 49 may be arranged so as not to be adjacent to each other by disposing free pins instead of the signal output terminals 23, 27, 33, 37, 43, 47. With this configuration, a short circuit between the respective feed terminals 28, 38, 48 and the corresponding ground terminals 29, 39, 49 can be suppressed.

The first feed terminal 28 is connected to the first regulator 691 through a wiring pattern 601 disposed on the substrate 6. A voltage regulated in the first regulator 691 is thus supplied to the first sensing portion 20.

The second feed terminal 38 is connected to the second regulator 692 through a wiring pattern 602 disposed on the substrate 6. A voltage regulated in the second regulator 692 is thus supplied to the second sensing portion 30.

The third feed terminal 48 is connected to the third regulator 693 through a wiring pattern 603 disposed on the substrate 6. A voltage regulated in the third regulator 693 is thus supplied to the third sensing portion 40.

In short, in the present embodiment, power is supplied separately to the sensing portions 20, 30, 40 from the regulators 691, 692, 693, respectively.

In the present embodiment, the first regulator 691, the second regulator 692, and the third regulator 693 are included in the power supply IC 69. Alternatively, each regulator may be provided as a separate IC. In the present embodiment, the first regulator 691, the second regulator 692, and the third regulator 693 correspond to "a feed portion".

Figure 7:
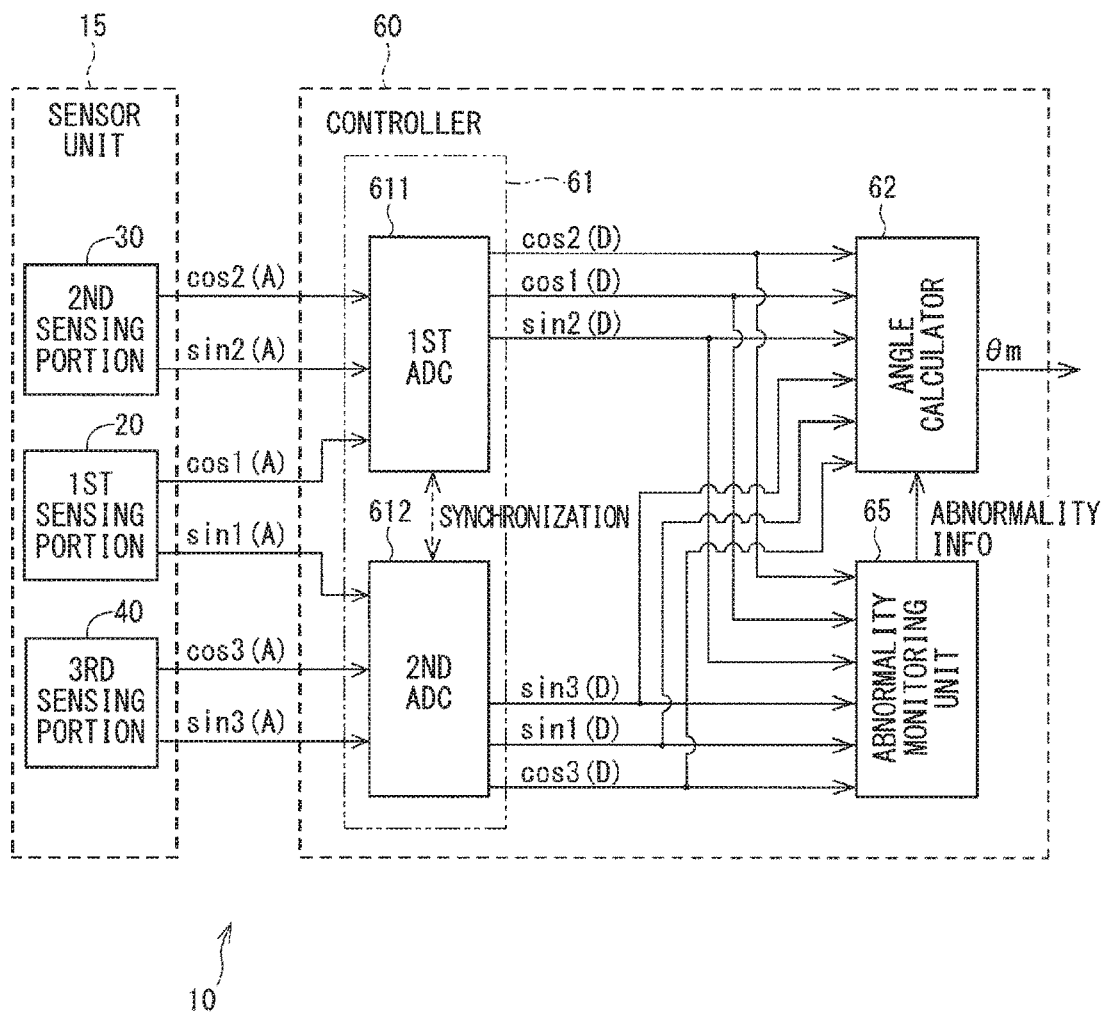
FIG. 7 is a block diagram showing a controller according to the first embodiment of the present disclosure.

As are shown in FIG. 3 and FIG. 7, the controller 60 controls the driving of the motor 80 and includes a microcomputer that performs various calculations and other components. The controller 60 includes a CPU, a ROM, a RAM, and I/O, and a bus line interconnecting the foregoing components and so on. Various types of processes performed by the controller 60 may be software processes carried out by executing a pre-stored program in the CPU or hardware process carried out by special-purpose electronic circuits.

As is shown in FIG. 7, the controller 60 includes functional blocks including an analogue to digital conversion circuit 61, an angle calculator 62, and an abnormality monitoring unit 65.

The analogue to digital conversion circuit 61 includes two analogue to digital converters (ADC) 611 and 612.

The first AD converter 611 obtains the second cosine signal, the second sine signal, and the first cosine signal, and converts the obtained signals from analog signals to digital signals. The second AD converter 612 obtains the first sine signal, the third cosine signal, and the third sine signal, and converts the obtained signals from analog signals to digital signals.

The sine signals and the cosine signals converted to digital signals are outputted to the angle calculator 62 and the abnormality monitoring unit 65.

In the drawing, the first sine signal is denoted as "sin1", the first cosine signal as "cos1,", the second sine signal as "sin2", the second cosine signal as "cos2", the third sine signal as "sin3", and the third cosine signal as "cos3". In addition, (A) attached to the signal names indicates analog signals and (D) attached to the signal names indicates digital signals.

The following will describe orders of signal conversion from analog signals to digital signals (hereinafter, also referred to as analogue to digital conversion orders) in the AD converters 611 and 612 with reference to FIG. 8. AD conversion cycles ΔT in the AD converters 611 and 612 are equal to one another and in synchronous with each other.

The first AD converter 611 first converts the second cosine signal obtained at a time T1 from analog to digital and outputs the converted digital signal at a time T2. Subsequently, the first AD converter 611 converts the first cosine signal obtained at the time T2 from analog to digital and outputs the converted digital signal at a time T3. Further, the first AD converter 611 converts the second sine signal obtained at the time T3 from analog to digital and outputs the converted digital signal at a time T4.

The second AD converter 612 first converts the third sine signal obtained at the time T1 from analog to digital and outputs the converted digital signal at the time 12. Subsequently, the second AD converter 612 converts the first sine signal obtained at the time T2 from analog to digital and outputs the converted digital signal at the time T3. Further, the second AD converter 612 converts the third sine signal obtained at the time T3 from analog to digital and outputs the converted digital signal at the time T4.

Figure 8:
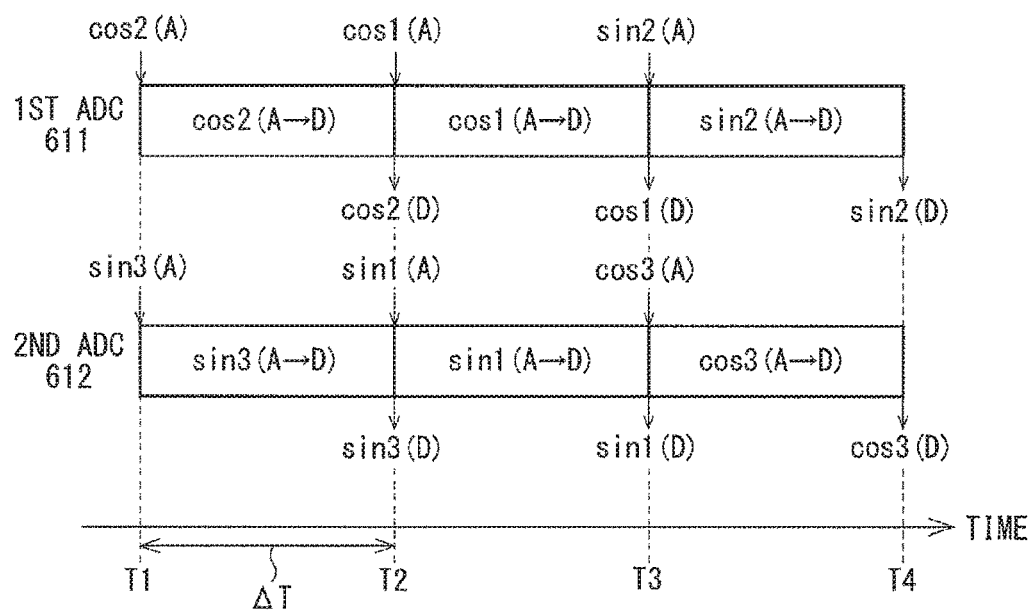
FIG. 8 is a time chart used to describe orders of analog to digital signal conversions according to the first embodiment of the present disclosure.

As is shown in FIG. 8, in the present embodiment, when the first AD converter 611 converts sine signal from analog to digital, the second AD converter 612 coverts cosine signal from analog to digital. Further, when the first AD converter 611 converts cosine signal from analog to digital, the second AD converter 612 coverts sine signal from analog to digital.

The sine signals and the cosine signals converted to digital signals are used in processes executed by the angle calculator 62 and the abnormality monitoring unit 65. Hereinafter, a value converted to a digital signal from the sine signal or the cosine signal by the analogue to digital conversion is referred to simply as "a sine signal" or "a cosine signal".

The angle calculator 62 calculates an arc tangent using at least one of the first sine signal, the second sine signal, and the third sine signal and at least one of the first cosine signal, the second cosine signal, and the third cosine signal. The angle calculator 62 calculates a mechanical angle θm on the basis of the calculated arc tangent. In the present embodiment, the mechanical angle θm corresponds to "a rotation angle of the detection target".

The abnormality monitoring unit 65 monitors an abnormality of the sensing portions 20, 30, 40 by comparing the first sine signal, the second sine signal, and the third sine signal which are signals of a same type and by comparing the first cosine signal, the second cosine signal, and the third cosine signal which are signals of a same type. The abnormality monitoring unit 65 outputs an abnormality monitoring result to the angle calculator 62 as abnormality information.

Figure 9:
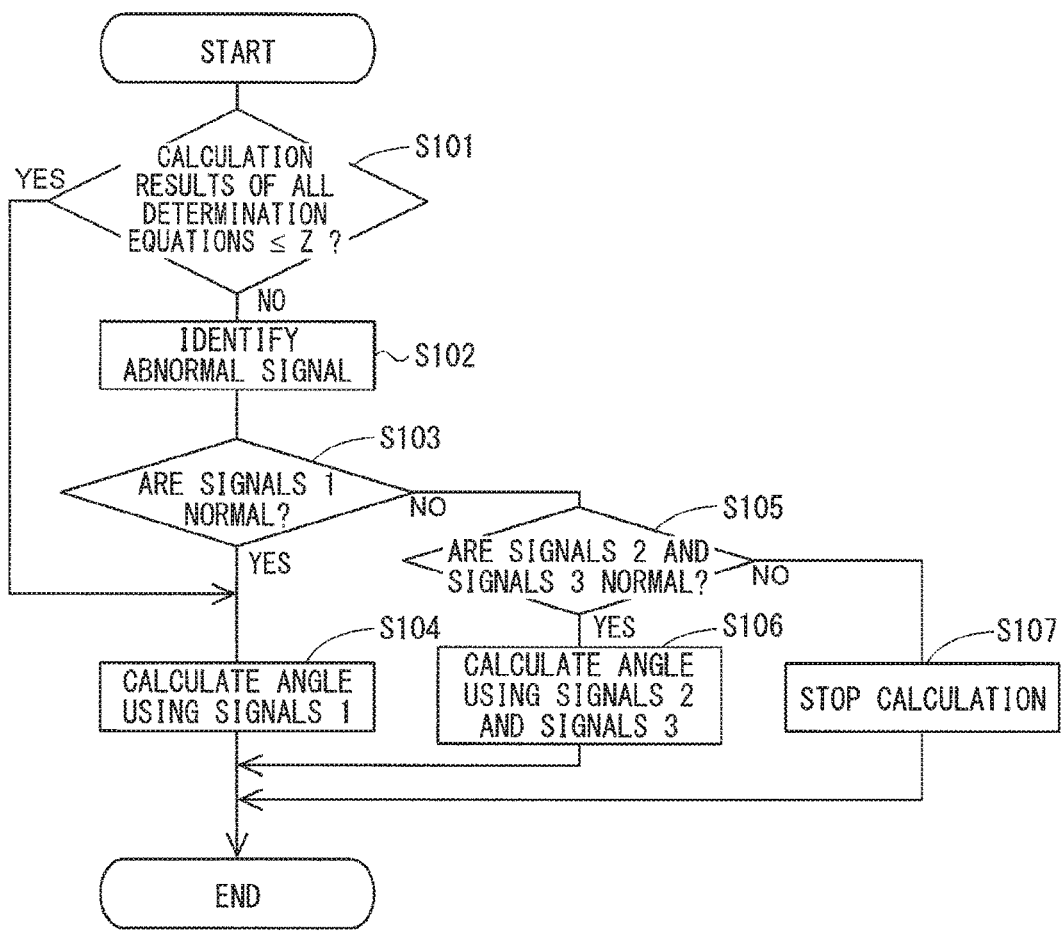
FIG. 9 is a flowchart showing an angle calculation process according to the first embodiment of the present disclosure.

The following will describe an angle calculation and abnormality monitoring with reference to FIG. 9 and FIG. 10. In FIG. 9 and FIG. 10, signals from the first sensing portion 20 are denoted as "signals 1", signals from the second sensing portion 30 are denoted as "signals 2", and signals from the third sensing portion 40 are denoted as "signals 3".

The following will describe the angle calculation process with reference to a flowchart of FIG. 9. The angle calculation process is executed by the controller 60 at a predetermined cycle. The predetermined execution cycle of the angle calculation process is at least three times greater than the AD conversion cycle ΔT.

In first step S101, the abnormality monitoring unit 65 determines whether calculation results of all determination equations are equal to or less than a determination threshold Z. Hereinafter, "step" used in "step S101" is abbreviated to "S" and the same applies to other steps. The determination threshold Z can be set to a proper value as needed. Hereinafter, a description will be given on the assumption that the determination threshold has a constant value Z. It should be understood that the determination threshold may be set different, for example, for different determination equations.

The determination equations are expressed by Equation (1) through Equation (6) as follows:

$$|sin1 --- sin2| \quad (1)$$

$$|cos1 --- cos2| \quad (2)$$

$$|sin1 --- sin3| \quad (3)$$

$$|cos1 --- cos3| \quad (4)$$

$$|sin1 --- sin3| \quad (5)$$

$$|cos2 --- cos3| \quad (6)$$

When calculation results of all of the determination equations are determined as being equal to or less than the determination threshold Z (S101: YES), the process proceeds to S104 on the assumption that all of signals from the first sensing portion 20, signals from the second sensing portion 30, and signals from the third sensing portion 40 are normal. When a calculation result of at least one determination equation is determined as being greater than the determination threshold Z (S101: NO), the process proceeds to S102.

In S102, the abnormality monitoring unit 65 identifies an abnormal signal. The following will describe in which manner the abnormal signal is identified in detail with reference to FIG. 10.

In S103, the abnormality monitoring unit 65 determines whether signals from the first sensing portion 20 are normal. When signals from the first sensing portion 20 are determined as being abnormal (S103: NO), the process proceeds to S105. When signals from the first sensing portion 20 are determined as being normal (S103: YES), the process proceeds to S104.

In S104 in which signals from all of the sensing portions 20, 30 and 40 are determined as being normal (S101: YES) or signals from the first sensing portion 20 are determined as being normal (S103: YES), the angle calculator 62 performs an angle calculation by using signals from the first sensing portion 20. In short, in the present embodiment, the angle calculator 62 performs an angle calculation by using signals from the first sensing portion 20 when the first sensing portion 20 is normal.

In S105 in which when signals from the first sensing portion 20 are determined as being abnormal (S103: NO), the abnormality monitoring unit 65 determines whether signals from the second sensing portion 30 and the third sensing portion 40 are normal. When signals from the second sensing portion 30 and the third sensing portion 40 are determined as being normal (S105: YES), the process proceeds to S106. When signals from the second sensing portion 30 or the third sensing portion 40 are determined as being abnormal (S105: NO), the process proceeds to S107.

In S106, the angle calculator 62 performs an angle calculation by using signals from at least one of the second sensing portion 30 or the third sensing portion 40. In the present embodiment, the angle calculator 62 performs an angle calculation by using signals from both of the second sensing portion 30 and the third sensing portion 40.

In S107, the angle calculator 62 stops the angle calculation because the abnormality monitoring unit 65 fails to identify a normal sensing portion.

The following will describe the abnormality monitoring process in detail with reference to FIG. 10. In FIG. 10, a mark "O" is used for a case where signals are determined as being normal and a mark "X" is used for a case where signals are determined as being abnormal. In the drawing, a mark ":" indicates that two signals are compared. For example, "signals 1:signals 2" means a case where the first sine signal and the second sine signal are compared and the first cosine signal and the second cosine signal are compared. The same applies to FIG. 12 and similar drawings described in embodiments below.

In the present embodiment, the first sensing portion 20 on the rotation center C is provided as a center sensing portion and the second sensing portion 30 and the third sensing portion 40 disposed at positions displaced from the rotation center C are provided as non-center sensing portions. When the first sensing portion 20 is normal, the angle calculator 62 performs an angle calculation by using signals from the first sensing portion 20. More specifically, when the first sensing portion 20 is normal, the angle calculator 62 performs an angle calculation by using the first sine signal and the first cosine signal obtained at the time T2.

When the first sensing portion 20 is abnormal, the angle calculator 62 performs an angle calculation by using either signals from the second sensing portion 30 or signals from the third sensing portion 40, or by using both signals from the second sensing portion 30 and the third sensing portion 40.

The abnormality monitoring unit 65 monitors an abnormality of the sine signals by performing calculations for three combinations to compare every two sine signals among the sine signals outputted from the three sensing portions 20, 30, 40. Likewise, the abnormality monitoring unit 65 also monitors an abnormality of the cosine signals by performing calculations for three combinations to compare every two cosine signals among the cosine signals outputted from the three sensing portions 20, 30, 40. In short, in the present embodiment, the abnormality monitoring unit 65 monitors an abnormality of the sensing portions 20, 30, 40 by performing calculations for three different ways×2 (sine signal and cosine signal).

More specifically, when an absolute value of a difference between the first sine signal and the second sine signal is greater than the determination threshold Z, the abnormality monitoring unit 65 determines that at least one of the first sine signal or the second sine signal is abnormal. Likewise, when an absolute value of a difference between the first sine signal and the third sine signal is greater than the determination threshold Z, the abnormality monitoring unit 65 determines that at least one of the first sine signal or the third sine signal is abnormal. When an absolute value of a difference between the second sine signal and the third sine signal is greater than the determination value Z, the abnormality monitoring unit 65 determines that at least one of the second sine signal or the third sine signal is abnormal.

When an absolute value of a difference between the first cosine signal and the second cosine signal is greater than the determination threshold Z, the abnormality monitoring unit 65 determines that at least one of the first cosine signal or the second cosine signal is abnormal. Likewise, when an absolute value of a difference between the first cosine signal and the third cosine signal is greater than the determination threshold Z, the abnormality monitoring unit 65 determines that at least one of the first cosine signal or the third cosine signal is abnormal. When an absolute value of a difference between the second cosine signal and the third cosine signal is greater than the determination value Z, the abnormality monitoring unit 65 determines that at least one of the second cosine signal or the third cosine signal is abnormal.

When all of a difference between the first sine signal and the second sine signal, a difference between the first sine signal and the third sine signal, and a difference between the second sine signal and the third sine signal are equal to or less than the determination threshold Z and all of a difference between the first cosine signal and the second cosine signal, a difference between the first cosine signal and the third cosine signal, and a difference between the second cosine signal and the third cosine signal are equal to or less than the determination threshold Z, the abnormality monitoring unit 65 determines that all of the sensing portions 20, 30, 40 are normal. In this case, since the first sensing portion 20 is normal, the angle calculator 62 performs an angle calculation by using the first sine signal and the first cosine signal.

When a difference between the first sine signal and the second sine signal and a difference between the second sine signal and the third sine signal are greater than the determination threshold Z and a difference between the first sine signal and the third sine signal is equal to or less than the determination threshold Z, the abnormality monitoring unit 65 determines that the second sine signal is abnormal.

When a difference between the first cosine signal and the second cosine signal and a difference between the second cosine signal and the third cosine signal are greater than the determination threshold Z and a difference between the first cosine signal and the third cosine signal is equal to or less than the determination threshold Z, the abnormality monitoring unit 65 determines that the second cosine signal is abnormal.

When the second sine signal or the second cosine signal is abnormal, the abnormality monitoring unit 65 determines that the second sensing portion 30 is abnormal.

In this case, since the first sensing portion 20 is normal, the angle calculator 62 performs an angle calculation by using the first sine signal and the first cosine signal. Consequently, even in the event of an abnormality in the second sensing portion 30, the angle calculation can be continued with accuracy as high as accuracy calculated when all the sensing portions 20, 30, 40 are normal.

The abnormality monitoring unit 65 continues to monitor an abnormality by comparing the first sine signal with the third sine signal and the first cosine signal with the third cosine signal. Monitoring of signals used for the angle calculation can be thus continued. When a difference between the first sine signal and the third sine signal or a difference between the first cosine signal and the third cosine signal becomes greater than the determination threshold Z, the abnormality monitoring unit 65 determines the occurrence of an abnormality in the first sensing portion 20 or the third sensing portion 40 and the angle calculator 62 stops the angle calculation. An erroneous angle calculation by using signals from the sensing portion having an abnormality can be thus prevented.

When the second sine signal or the second cosine signal is abnormal, the abnormality monitoring unit 65 determines that the second sensing portion 30 is abnormal. In the present embodiment, when the second sensing portion 30 is determined as being abnormal, the second sine signal and the second cosine signal, which are output from the second sensing portion 30, are used neither for an angle calculation nor for monitoring of an abnormality. In other words, in the present embodiment, an abnormality is monitored for each of the sensing portions 20, 30, 40. The same applies to a case when the first sensing portion 20 or the third sensing portion 40 is abnormal.

When a difference between the first sine signal and the third sine signal and a difference between the second sine signal and the third sine signal are greater than the determination threshold Z and a difference between the first sine signal and the second sine signal is equal to or less than the determination threshold Z, the abnormality monitoring unit 65 determines that the third sine signal is abnormal.

When a difference between the first cosine signal and the third cosine signal and a difference between the second cosine signal and the third cosine signal are greater than the determination threshold Z and a difference between the first cosine signal and the second cosine signal is equal to or less than the determination threshold Z, the abnormality monitoring unit 65 determines that the third cosine signal is abnormal.

When the third sine signal or the third cosine signal is abnormal, the abnormality monitoring unit 65 determines that the third sensing portion 40 is abnormal.

Herein, because the first sensing portion 20 is normal, the angle calculator 62 performs an angle calculation by using the first sine signal and the first cosine signal. Consequently, even in the event of an abnormality in the third sensing portion 40, the angle calculation can be continued with accuracy as high as accuracy calculated when all the sensing portions 20, 30, 40 are normal.

The abnormality monitoring unit 65 continues to monitor an abnormality by comparing the first sine signal with the second sine signal and the first cosine signal with the third cosine signal. Monitoring of signals used for the angle calculation can be thus continued. When a difference between the first sine signal and the second sine signal or a difference between the first cosine signal and the third cosine signal becomes greater than the determination threshold Z, the abnormality monitoring unit 65 determines the occurrence of an abnormality in the first sensing portion 20 or the second sensing portion 30 and the angle calculator 62 stops the angle calculation. An erroneous angle calculation by using signals from the sensing portion having an abnormality can be thus prevented.

When a difference between the first sine signal and the second sine signal and a difference between the first sine signal and the third sine signal are greater than the determination threshold Z and a difference between the second sine signal and the third sine signal is equal to or less than the determination threshold Z, the abnormality monitoring unit 65 determines that the first sine signal is abnormal.

When a difference between the first cosine signal and the second cosine signal and a difference between the first cosine signal and the third cosine signal are greater than the determination threshold Z and a difference between the second cosine signal and the third cosine signal is equal to or less than the determination threshold Z, the abnormality monitoring unit 65 determines that the first sensing portion 20 is abnormal.

When the first sine signal or the first cosine signal is abnormal, the abnormality monitoring unit 65 determines that the first sensing portion 20 is abnormal.

Herein, the angle calculator 62 performs an angle calculation by using the second sine signal, the third sine signal, the second cosine signal, and the third cosine signal instead of the first sine signal and the first cosine signal.

As has been described with reference to FIG. 5A through FIG. 5C, the second sensing portion 30 and the third sensing portion 40 are disposed at positions displaced from the rotation center C. Hence, detection accuracy of signals from the second sensing portion 30 and signals from the third sensing portion 40 may possibly be lower than detection accuracy of signals from the first sensing portion 20 disposed on the rotation center C. It should be noted, however, that the second sensing portion 30 and the third sensing portion 40 are disposed point-symmetrically with respect to the rotation center C. Hence, a waveform distortion component of the second sine signal with respect to the first sine signal and a waveform distortion component of the third sine signal with respect to the first sine signal are inverted. Likewise, a waveform distortion component of the second cosine signal with respect to the first cosine signal and a waveform distortion component of the third cosine signal with respect to the first cosine signal are inverted.

In view of the foregoing, the angle calculator 62 performs an angle calculation by using a sum of the second sine signal and the third sine signal and a sum of the second cosine signal and the third cosine signal. For example, using an average value of the second sine signal and the third sine signal is included in a concept of "using a sum". The same applies to the cosine signals. By taking a sum of the second sine signal and the third sine signal and a sum of the second cosine signal and the third cosine signal, waveform distortion components of the output signals can be cancelled each other out.

To be more exact, the mechanical angle Om differs at the times T1, T2, and T3 (see FIG. 8) while the motor 80 is rotating. The mechanical angle θm calculated when the first sensing portion 20 is normal is a value calculated at the time T2.

Meanwhile, the second sine signal is a value obtained at the time T3 and the third sine signal is a value obtained at the time T1. Also, the second cosine signal is a value obtained at the time T1 and the third cosine signal is a value obtained at the time T3. Accordingly, the mechanical angle θm calculated using a sum of the second sine signal and the third sine signal and a sum of the second cosine signal and the third cosine signal substantially equal to the value calculated at the time T2.

Hence, even when the first sensing portion 20 is abnormal, the angle calculation can be continued with high accuracy.

When at least one of the second sensing portion 30 or the third sensing portion 40 is disposed within an optimal field range for detection of a field of the magnet 85, the angle calculator 62 may perform an angle calculation by using signals from the second sensing portion 30, namely, the second sine signal and the second cosine signal, or signals from the third sensing portion 40, namely, the third sine signal and the third cosine signal. The angle calculator 62 may perform a correction calculation to correct a detection error caused by displacement of the sensing portion from the rotation center C.

The abnormality monitoring unit 65 continues to monitor an abnormality by comparing the second sine signal with the third sine signal and the second cosine signal with the third cosine signal. Hence, even when the first sensing portion 20 is abnormal, monitoring of signals used for the angle calculation can be continued. When a difference between the second sine signal and the third sine signal or a difference between the second cosine signal and the third cosine signal becomes greater than the determination threshold Z, the abnormality monitoring unit 65 determines the occurrence of an abnormality in the second sensing portion 30 or in the third sensing portion 40 and the angle calculator 62 stops the angle calculation. An erroneous angle calculation by using signals from the sensing portion having an abnormality can be thus prevented.

In the present embodiment, the AD converter 611 converts at least one sine signal and at least one cosine signal from analog to digital, and the AD converter 612 converts at least one sine signal and at least one cosine signal from analog to digital. Hence, even in the event of an abnormality in one of the AD converters 611 and 612, the angle calculation can be continued by using values outputted from the other one of the AD converter 611 and 612.

Each of the AD converters 611 and 612 obtains one of the sine signal or the cosine signal at the time T1 and obtains the other one of the sine signal or the cosine signal at the time T3 which is different type from the signal obtained at time T1. Hence, by performing an angle calculation by using one of the sine signal or the cosine signal obtained at the time T1 and the other one of the sine signal or the cosine signal obtained at the time T3, a difference between the mechanical angle θm calculated using the sine signal or the cosine signal obtained at the time T2 can be reduced.

More preferably, when an odd number of sensing portions are included and one sensing portion is disposed on the rotation center C, the sine signal from the center sensing portion is converted in one of the AD converters 611 and 612 and the cosine signal from the center sensing portion is converted in the other one of the AD converters 611 and 612 in the middle of the respective analogue to digital conversion orders. When other sensing portions except the center sensing portion are disposed point-symmetrically with respect to the rotation center C, the AD converters 611 and 612 convert the sine signals and the cosine signals from other sensing portions in a beginning-to-end symmetric order with respect to the conversion time of the signals from the center sensing portion.

Consequently, when abnormality occurs in partial sensing portions, an error caused by a shift of the conversion timing can be reduced.

As has been described in detail above, the rotation angle detection apparatus 10 of the present embodiment includes at least three (three in the present embodiment) sensing portions 20, 30, 40 and the controller 60.

The first sensing portion 20 includes the sine circuit unit 21 and the cosine circuit unit 25. The sine circuit unit 21 is a full-bridge circuit that outputs the first positive sine signal corresponding to a rotating magnetic field that varies with rotation of the magnet 85 and outputs the first negative sine signal having a polarity inverted from a polarity of the first positive sine signal. The cosine circuit unit 25 is a full-bridge circuit that outputs the first positive cosine signal which is a signal corresponding to a rotating magnetic field that varies with rotation of the magnet 85 and out of phase with the first positive sine signal, and outputs the first negative cosine signal having a polarity inverted from a polarity of the first positive cosine signal.

The second sensing portion 30 includes the sine circuit unit 31 and the cosine circuit unit 35. The sine circuit unit 31 is a full-bridge circuit that outputs the second positive sine signal corresponding to a rotating magnetic field that varies with rotation of the magnet 85 and outputs the second negative sine signal having a polarity inverted from a polarity of the second positive sine signal. The cosine circuit unit 35 is a full-bridge circuit that outputs the second positive cosine signal which is a signal corresponding to a rotating magnetic field that varies with rotation of the magnet 85 and out of phase with the second positive sine signal, and outputs the second negative cosine signal having a polarity inverted from a polarity of the second positive cosine signal.

The third sensing portion 40 includes the sine circuit unit 41 and the cosine circuit unit 45. The sine circuit unit 41 is a full-bridge circuit that outputs the third positive sine signal corresponding to a rotating magnetic field that varies with rotation of the magnet 85 and outputs the third negative sine signal having a polarity inverted from a polarity of the third positive sine signal. The cosine circuit unit 45 is a full-bridge circuit that outputs the third positive cosine signal which is a signal corresponding to a rotating magnetic field that varies with rotation of the magnet 85 and out of phase with the third positive sine signal, and outputs the third negative cosine signal having a polarity inverted from a polarity of the third positive cosine signal.

The controller 60 includes the angle calculator 62 and the abnormality monitoring unit 65. The angle calculator 62 calculates a rotation angle (the mechanical angle θm in the present embodiment) of the magnet 85 on the basis of a sine signal, which corresponds to the positive sine signal and the negative sine signal outputted from at least one of the sine circuit units 21, 31, 41, and a cosine signal, which corresponds to the positive cosine signal and the negative cosine signal outputted from at least one of the cosine circuit units 25, 35, 45. The abnormality monitoring unit 65 compares signals of a same type outputted from the different sensing portions 20, 30 and 40 and monitors an abnormality according to a comparison result of the same type signals.

In the present embodiment, by providing three sensing portions each having two full-bridge circuits that output signals out of phase with each other, an abnormality can be determined by a relatively easy calculation, such as by calculating a difference between signals of a same type.

The sine circuit units 21, 31, 41 and the cosine circuit units 25, 35, 45 are provided by full-bridge circuits. Thus, offsets of signals outputted from the respective circuit portions 21, 31, 41, 25, 35, 45 can be cancelled. Hence, when partial signals are abnormal and the angle calculator 62 continues an angle calculation by using normal signals, a risk of deterioration of detection accuracy is lower in comparison with a case where signals from half-bridge circuits are used. Hence, a rotation angle can be detected with high accuracy even when the angle calculation is continued using remaining normal signals.

Even when a signal from one sine circuit unit becomes abnormal, monitoring of an abnormality is continued by comparing signals from the remaining two sine circuit units. The same applies to the cosine circuit units.

At least one of the sensing portions 20, 30, 40 is disposed at a position which enables a cancellation of a detection error caused by positional displacement from the rotation center. Herein, the rotation center is the center of the rotating magnetic field of the magnet 85.

Herein, the two sensing portions 30 and 40 are disposed point-symmetrically with respect to the rotation center. Consequently, waveform distortions of detected values in the sensing portions 30 and 40 caused by positional displacement from the rotation center can be cancelled each other out, for example, by adding signals from the second sensing portion 30 to the signals from the third sensing portion 40.

The center of the first sensing portion 20 is disposed on the center line C of the rotating magnetic field of the magnet 85. In other words, the sensing portion 20 on the center line C has no positional displacement from the rotation center. In the present embodiment, being disposed on the center line C as the sensing portion 20 is included in the concept of "being disposed at a position at which positional displacement from the rotation center can be cancelled". Consequently, the rotating magnetic field of the magnet 85 can be properly detected by the first sensing portion 20.

When signals outputted from the first sensing portion 20 as the center sensing portion are normal, the angle calculator 62 calculates the mechanical angle θm on the basis of signals outputted from the first sensing portion 20.

When signals outputted from the first sensing portion 20 are abnormal and signals outputted from the symmetric sensing portions are normal, the angle calculator 62 calculates the mechanical angle Om by using signals from the second sensing portion 30 and the third sensing portion 40, which make up the normal symmetric sensing portion set.

With the above configuration, when the first sensing portion 20 has no abnormality, the angle calculator 62 is capable of calculating the mechanical angle θm appropriately on the basis of signals outputted from the first sensing portion 20 disposed on the rotation center C.

When the first sensing portion 20 has an abnormality, the angle calculation can be continued by using at least either signals outputted from the second sensing portion 30 or signals outputted from the third sensing portion 40. In the present embodiment, the angle calculator 62 performs an angle calculation by using sums of signals from the second sensing portion 30 and the third sensing portion 40, which make up a symmetric sensing portion set and cancel angular errors caused by positional displacement from the rotation center C with one another. The angle calculation can be thus continued with accuracy as high as accuracy in properly operating state without abnormality occurrence.

Power is supplied to the sensing portions 20, 30, 40 separately from the regulators 691, 692, 693 provided for the sensing portions 20, 30, 40, respectively. Consequently, even in the event of an abnormality occurrence in any one of the regulators 691, 692, 693, the angle calculation can be continued by using signals from the sensing portions to which power is supplied from the normal regulators.

The rotation angle detection apparatus 10 further includes the sealing portion 16 and the terminal portions 17 and 18.

The sealing portion 16 seals multiple sensing portions 20, 30, 40.

The terminal portions 17 and 18 include multiple signal output terminals 23, 27, 33, 37, 43, 47 used to output signals from respective sine circuit units 21, 31, 41, the feed terminals 28, 38, 48 used to feed power to respective sensing portions 20, 30, 40, and the ground terminals 29, 39, 49 used to connect the sensing portions 20, 30, 40 to the ground. The terminal portions 17 and 18 protrude from the sealing portion 16.

A terminal other than the signal output terminals is disposed between one signal output terminal and adjacent another signal output terminal. Consequently, an erroneous detection of a rotation angle caused by a short circuit between the signal output terminals can be suppressed.

Terminals other than the feed terminals 28, 38, 48 and the ground terminals 29, 39, 49 are disposed between the respective feed terminals 28, 38, 48 and the corresponding ground terminals 29, 39, 49. Consequently, a short circuit between the respective feed terminals 28, 38, 48 and the corresponding ground terminals 29, 39, 49 can be suppressed.

In the present embodiment, the main positive signal is the positive sine signal and the main negative signal is the negative sine signal. The subsidiary positive signal is the positive cosine signal and the subsidiary negative signal is the negative cosine signal. The positive cosine signal and the positive sine signal are 90° out of phase with each other.

The angle calculator 62 is thus capable of performing an angle calculation appropriately on the basis of the positive sine signal, the negative sine signal, the positive cosine signal, and the negative cosine signal.

The first sensing portion 20 includes the sine differential amplifier 22 and the cosine differential amplifier 26.

One of the first positive sine signal and the first negative sine signal is inputted into the plus input terminal and the other one is inputted into the minus input terminal, the sine differential amplifier 22 outputs the first sine signal to the controller 60. One of the first positive cosine signal and the first negative cosine signal is inputted into the plus input terminal and the other one is inputted into the minus input terminal, the cosine differential amplifier 26 outputs the first cosine signal to the controller 60.

The second sensing portion 30 includes the sine differential amplifier 32 and the cosine differential amplifier 36.

One of the second positive sine signal and the second negative sine signal is inputted into the plus input terminal and the other one is inputted into the minus input terminal, the sine differential amplifier 32 outputs the second sine signal to the controller 60. One of the second positive cosine signal and the second negative cosine signal is inputted into the plus input terminal and the other one is inputted into the minus input terminal, the cosine differential amplifier 36 outputs the second cosine signal to the controller 60.

The third sensing portion 40 includes the sine differential amplifier 42 and the cosine differential amplifier 46.

One of the third positive sine signal and the third negative sine signal is inputted into the plus input terminal and the other one is inputted into the minus input terminal, the sine differential amplifier 42 outputs the third sine signal to the controller 60. One of the third positive cosine signal and the third negative cosine signal is inputted into the plus input terminal and the other one is inputted into the minus input terminal, the cosine differential amplifier 46 outputs the third cosine signal to the controller 60.

Consequently, the number of the terminals can be reduced in comparison with a case where all of the positive sine signals, the negative sine signals, the positive cosine signals, and the negative cosine signals are outputted separately to the outside of the sensing portions 20, 30, 40.

When a difference value, which is an absolute value of a difference between signals of a same type outputted from the different sensing portions 20, 30, 40, is greater than the determination threshold Z, the abnormality monitoring unit 65 determines that one of the signals used in the difference calculation is abnormal. Hence, an abnormality can be determined by a relatively easy calculation.

The abnormality monitoring unit 65 compares difference values of at least two sets of signals outputted from the respective sine circuit units 21, 31, 41 and difference values of at least two sets of signals outputted from the respective cosine circuit units 25, 35, 45 with the determination threshold Z. In the present embodiment, the abnormality monitoring unit 65 compares a difference value between the first sine signal and the second sine signal, a difference value between the first sine signal and the third sine signal, and a difference value between the second sine signal and the third sine signal, respectively, with the determination threshold Z. In short, in the present embodiment, the abnormality monitoring unit 65 compares each of the difference values of three sets with the determination threshold Z. The same applies to the cosine signals. Consequently, an abnormal signal can be identified easily and appropriately.

The controller 60 includes the analogue to digital conversion circuit 61 that converts the sine signals and the cosine signals from analog to digital.

The analogue to digital conversion circuit 61 includes multiple AD converters 611 and 612. Each of the AD converters 611 and 612 converts at least one sine signal and at least one cosine signal from analog to digital. Consequently, even in the event of an abnormality in partial AD converters, the angle calculation can be continued by using the sine signal and the cosine signal converted from analog to digital in the normal AD converter.

In the present embodiment, three sensing portions, namely, the first sensing portion 20, the second sensing portion 30, and the third sensing portion 40 are provided, and two AD converters, namely, the first AD converter 611 and the second AD converter 612 which obtain signals and output signals at synchronized timing are provided.

The first AD converter 611 converts one of the sine signal and the cosine signal from the first sensing portion 20 and the sine signal and the cosine signal from the second sensing portion 30 from analog to digital.

The second AD converter 612 converts the other one of the sine signal and the cosine signal from the first sensing portion 20 and the sine signal and the cosine signal from the third sensing portion 40 from analog to digital.

The analogue to digital conversion order in the first AD converter 611 is one of the second sine signal and the second cosine signal, followed by one of the sine signal and the cosine signal from the first sensing portion 20, and the remaining one of the second sine signal and the second cosine signal.

The analogue to digital conversion order in the second AD converter 612 is one of the third sine signal and the third cosine signal, whichever is of a different type from the signal converted in the first AD converter 611, followed by the remaining one of the sine signal and the cosine signal from the first sensing portion 20, and the remaining one of the third sine signal and the third cosine signal.

That is to say, when the second sine signal is converted from analog to digital first in the first AD converter 611, the third cosine signal is converted from analog to digital first in the second AD converter 612, and conversely, when the second cosine signal is converted from analog to digital first in the first AD converter 611, the third sine signal is converted from analog to signal first in the second AD converter 612.

Consequently, accuracy of an angle calculation can be increased in both of a case where all of the signals from the sensing portions 20, 30, 40 are normal and a case where the angle calculation is continued by using remaining normal signals when an abnormality occurs in partial signals.

Second Embodiment

Figure 11:
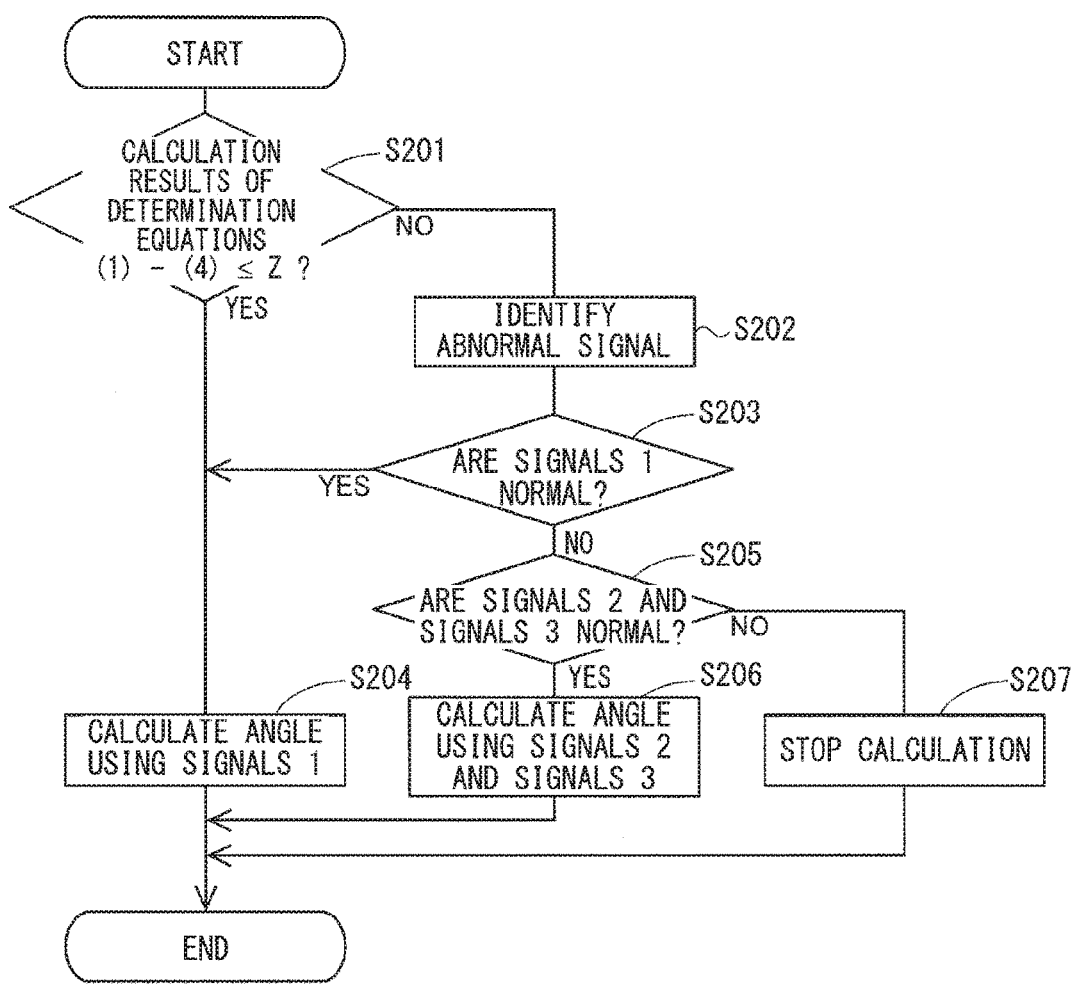
FIG. 11 is a flowchart showing an angle calculation process according to a second embodiment of the present disclosure.

The following will describe a second embodiment of the present disclosure with reference to FIG. 11 and FIG. 12.

First, an angle calculation process of the present embodiment will be described in accordance with a flowchart of FIG. 11.

In S201, an abnormality monitoring unit 65 determines whether calculation results of Determination Equations (1) through (4) above are equal to or less than a determination threshold Z. Herein, four determination equations are used. However, one of a set of Determination Equations (1) and (2) and a set of Determination Equations (3) and (4) may be omitted. When the calculation results of all of Determination Equations (1) through (4) are determined as being equal to or less than the determination threshold Z (S201: YES), the process proceeds to S204 on the assumption that signals from a first sensing portion 20 are normal. When a calculation result of at least one of Determination Equations (1) through (4) is determined as being greater than the determination threshold Z (S201: NO), the process proceeds to S202.

In S202, the abnormality monitoring unit 65 identifies an abnormal signal by calculating Determination Equations (5) and (6) above. The following will describe in which manner the abnormality monitoring unit 65 identifies an abnormal signal in detail below with reference to FIG. 12.

Processing in S203 through S207 is same as the process in S103 through S107 of FIG. 9 described above.

The following will describe abnormality monitoring process in detail with reference to FIG. 12.

In the present embodiment, when the first sensing portion 20, which is a center sensing portion, is normal, an angle calculator 62 performs an angle calculation by using a first sine signal and a first cosine signal from the first sensing portion 20 as in the above embodiment.

When sensing portions 20, 30, 40 are normal, the abnormality monitoring unit 65 chiefly monitors the first sensing portion 20. More specifically, when the sensing portions 20, 30, 40 are normal, the abnormality monitoring unit 65 monitors the first sine signal and the first cosine signal by comparing the first sine signal with a second sine signal, the first sine signal with a third sine signal, the first cosine signal with a second cosine signal, and the first cosine signal with a third cosine signal. In other words, when the first sensing portion 20 is normal, the abnormality monitoring unit 65 skips a comparison of signals outputted from the second sensing portion 30 with signals outputted from the third sensing portion 40.

When all of a difference between the first sine signal and the second sine signal, a difference between the first sine signal and the third sine signal, a difference between the first cosine signal and the second cosine signal, and a difference between the first cosine signal and the third cosine signal are equal to or less than the determination threshold Z, the abnormality monitoring unit 65 assumes that the sensing portions 20, 30, 40 are normal.

When a difference between the first sine signal and the second sine signal is greater than the determination threshold Z and a difference between the first sine signal and the third sine signal is equal to or less than the determination threshold Z, the abnormality monitoring unit 65 assumes that the second sine signal is abnormal. When a difference between the first cosine signal and the second cosine signal is greater than the determination threshold Z and a difference between the first cosine signal and the third cosine signal is equal to or less than the determination threshold Z, the abnormality monitoring unit 65 assumes that the second cosine signal is abnormal.

When the second sine signal or the second cosine signal is abnormal, the abnormality monitoring unit 65 assumes that the second sensing portion 30 is abnormal. Herein, the angle calculator 62 continues the angle calculation by using the first sine signal and the first cosine signal from the first sensing portion 20. Also, the abnormality monitoring unit 65 continues to monitor an abnormality by comparing signals from the first sensing portion 20 with signals from the third sensing portion 40.

When a difference between the first sine signal and the second sine signal is equal to or less than the determination threshold Z and a difference between the first sine signal and the third sine signal is greater than the determination threshold Z, the abnormality monitoring unit 65 assumes that the third sine signal is abnormal. When a difference between the first cosine signal and the second cosine signal is equal to or less than the determination threshold Z and a difference between the first cosine signal and the third cosine signal is greater than the determination threshold Z, the abnormality monitoring unit 65 assumes that the third sine signal is abnormal.

When the third sine signal or the third cosine signal is abnormal, the abnormality monitoring unit 65 assumes that the third sensing portion 40 is abnormal. Herein, the angle calculator 62 continues the angle calculation by using the first sine signal and the first cosine signal from the first sensing portion 20. Also, the abnormality monitoring unit 65 continues to monitor an abnormality by comparing signals from the first sensing portion 20 with signals from the second sensing portion 30.

When both of a difference between the first sine signal and the second sine signal and a difference between the first sine signal and the third sine signal are greater than the determination threshold Z, the abnormality monitoring unit 65 assumes that the first sine signal is abnormal. When both of a difference between the first cosine signal and the second cosine signal and a difference between the first cosine signal and the third cosine signal are greater than the determination threshold Z, the abnormality monitoring unit 65 assumes that the first cosine signal is abnormal.

When the first sine signal or the first cosine signal is abnormal, the abnormality monitoring unit 65 assumes that the first sensing portion 20 is abnormal. Herein, the angle calculator 62 continues the angle calculation by using at least either signals outputted from the second senor portion 30 or signals outputted from the third sensing portion 40. Also, the abnormality monitoring unit 65 continues to monitor an abnormality by comparing signals from the second sensing portion 30 with signals from the third sensing portion 40.

In the present embodiment, the abnormality monitoring unit 65 monitors an abnormality according to a comparison result between signals from the sensing portion 20 disposed on a center line C of a rotating magnetic field of a magnet 85 and signals from the sensing portions 30 and 40 which are sensing portions other than the center sensing portion.

More specifically, when signals outputted from the first sensing portion 20 are normal, the abnormality monitoring unit 65 monitors an abnormality of signals outputted from the first sensing portion 20 according to at least one of a comparison result of signals outputted from the first sensing portion 20 and signals outputted from the second sensing portion 30 and a comparison result of signals outputted from the first sensing portion 20 and signals outputted from the third sensing portion 40.

When signals outputted from the first sensing portion 20 are abnormal, the abnormality monitoring unit 65 monitors an abnormality according to a comparison result of signals outputted from the second sensing portion 30 and signals outputted from the third sensing portion 40.

More specifically, when the first sensing portion 20 is normal, the abnormality monitoring unit 65 does not compare signals from the second sensing portion 30 with signals from the third sensing portion 40. Hence, in comparison with a case where signals are compared for all combinations, a calculation load on the abnormality monitoring unit 65 can be reduced.

In addition, advantages same as the advantages of the above embodiment above can be achieved, too.

Third Embodiment

Figure 13:
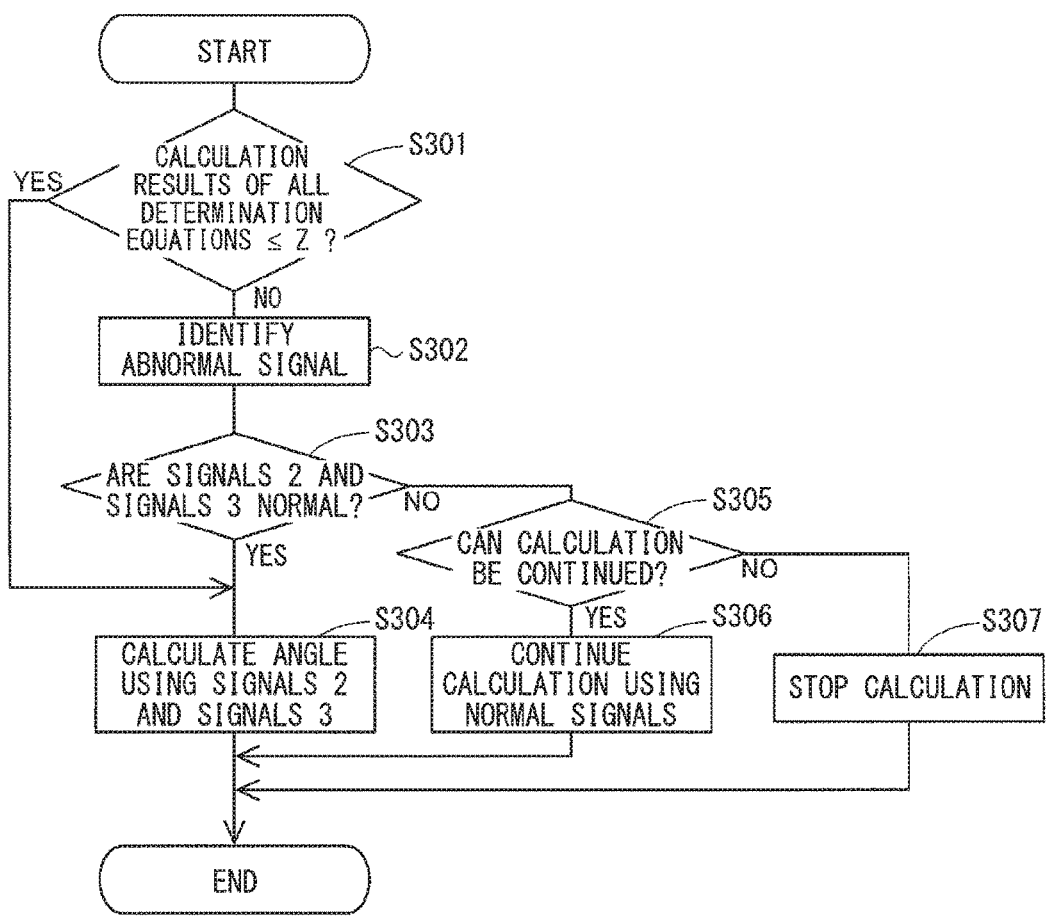
FIG. 13 is a flowchart showing an angle calculation process according to a third embodiment of the present disclosure.

The following will describe a third embodiment of the present disclosure with reference to FIG. 13.

First, an angle calculation process of the present embodiment will be described in accordance with a flowchart of FIG. 13.

S301 and S302 are same, respectively, as S101 and S302 of FIG. 9 described in the first embodiment above.

In S303, an abnormality monitoring unit 65 determines whether signals from a second sensing portion 30 and a third sensing portion 40 are normal. When signals from the second sensing portion 30 and the third sensing portion 40 are determined as being normal (S303: YES), the process proceeds to S304. When signals from the second sensing portion 30 or the third sensing portion 40 are determined as being abnormal (S303: NO), the process proceeds to S305.

In step 304 to which advancement is made when signals from all of the sensing portions 20, 30, 40 are determined as being normal (S301: YES) or when signals from the second sensing portion 30 and the third sensing portion 40 are determined as being normal (S303: YES), an angle calculator 62 performs an angle calculation by using signals from the second sensing portion 30 and the third sensing portion 40. That is to say, in the present embodiment, when the second sensing portion 30 and the third sensing portion 40 are normal, the angle calculator 62 performs an angle calculation by using signals from the second sensing portion 30 and the third sensing portion 40.

In S305 to which advancement is made when signals from the second sensing portion 30 or the third sensing portion 40 are determined as being abnormal (S303: NO), the abnormality monitoring unit 65 determines whether the angle calculation can be continued. When both of the first sensing portion 20 and the second sensing portion 30 are normal or when both of the first sensing portion 20 and the third sensing portion 40 are normal, the abnormality monitoring unit 65 determines that the angle calculation can be continued. When it is determined that the angle calculation can be continued (S305: YES), the process proceeds to S306. Conversely, when it is determined that the angle calculation can no longer be continued (S305: NO), the process proceeds to S307.

In S306, the angle calculator 62 continues the angle calculation by using normal signals. More specifically, when signals from the first sensing portion 20 and the second sensing portion 30 are normal, the angle calculator 62 performs an angle calculation by using signals from at least one of the first sensing portion 20 and the second sensing portion 30. When signals from the first sensing portion 20 and the third sensing portion 40 are normal, the angle calculator 62 performs an angle calculation by using signals from at least one of the first sensing portion 20 and the third sensing portion 40.

Processing in S307 is same as the process in S107 of FIG. 9 described in the first embodiment above.

In the present embodiment, when all of the sensing portions 20, 30, 40 are normal, signals outputted from the second sensing portion 30 and signals outputted from the third sensing portion 40, that is, signals outputted from a combination with which angular errors caused by displacement from a rotation center C can be cancelled each other out, are used for an angle calculation. More specifically, the angle calculator 62 performs an angle calculation by using a sum of a second sine signal and a third sine signal and a sum of a second cosine signal and a third cosine signal. When an angle calculation is performed using a sum of two signals of each type, influences of an angular error given from the occurrence of an abnormality in one of the signals to identification of the abnormality can be reduced. Also, a calculation load can be reduced in comparison with a case where three sine signals and three cosine signals are used.

When signals outputted from the sensing portions 30 and 40, which are at least one sensing portion in the symmetric sensing portion set, are normal, the angle calculator 62 calculates a mechanical angle Om by using signals outputted from the sensing portions 30 and 40 making up the normal symmetric sensing portion set. Consequently, a calculation error can be reduced and influences of an angular error in the event of an abnormality in the sensing portion used for an angular calculation can be reduced. In addition, a calculation load can be reduced in comparison with a case where an angle calculation is performed by using signals from all of the sensing portions 20, 30, 40.

Further, advantages same as the advantages of the embodiments above can be achieved, too.

Fourth Embodiment

Figure 14:
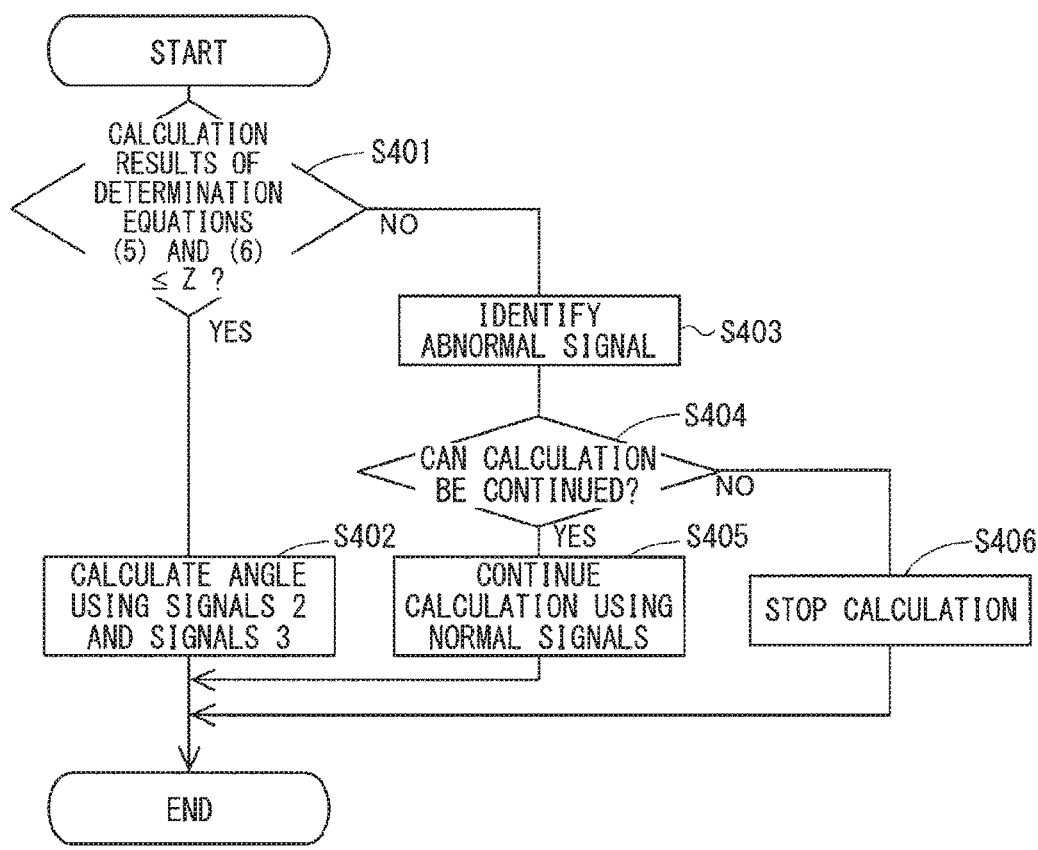
FIG. 14 is a flowchart showing an angle calculation process according to a fourth embodiment of the present disclosure.

The following will describe a fourth embodiment of the present disclosure with reference to FIG. 14.

First, an angle calculation process of the present embodiment will be described in accordance with a flowchart of FIG. 14.

In S401, an abnormality monitoring unit 65 determines whether calculation results of both of Determination Equations (5) and (6) above are equal to or less than a determination threshold Z. When the calculation results of both of Determination Equations (5) and (6) are determined as being equal to or less than the determination threshold Z (S401: YES), the process proceeds to S402. When the calculation result of at least one of Determination Equations (5) and (6) is determined as being greater than the determination threshold Z (S401; NO), the process proceeds to S403.

Processing in S402 is same as the process in S304 of FIG. 13 of the third embodiment described above.

In S403, the abnormality monitoring unit 65 identifies an abnormal signal by calculating Determination Equations (1) through (4) above. Details as to in which manner an abnormal signal is identified are same as the details described in the embodiments above.

Processing in S404 through S406 is same as the process in S305 through S306 of FIG. 13 described in the third embodiment above.

In the present embodiment, when a second sensing portion 30 and a third sensing portion 40 are normal, the abnormality monitoring unit 65 does not compare signals from a first sensing portion 20 with signals from the second sensing portion 30 and signals from the first sensing portion 20 with signals from the third sensing portion 40. Consequently, a calculation load on the abnormality monitoring unit 65 can be reduced.

The abnormality monitoring unit 65 monitors an abnormality according to a comparison result of signals from the sensing portions 30 and 40 which are disposed point-symmetrically with respect to a rotation center. Consequently, in comparison with a case where signals are compared for all combinations, a calculation load on the abnormality monitoring unit 65 can be reduced.

In addition, advantages same as the advantages of the embodiments above can be achieved, too.

Fifth Embodiment

The following will describe a fifth embodiment of the present disclosure with reference to FIG. 15.

In the present embodiment, an angle calculator 62 performs an angle calculation by using at least one signal of each type among normal signals, for example, when all of sensing portions 20, 30, 40 are disposed within an optimal field range.

More specifically, when all of the sensing portions 20, 30, 40 are normal, the angle calculator 62 performs an angle calculation by using at least one of signals of each type outputted from the first sensing portion 20, the second sensing portion 30, and the third sensing portion 40.

In the present embodiment, any one of a first sine signal, a second sine signal, and a third sine signal may be used as a sine signal. Alternatively, a calculation value, for example, an average value of multiple sine signals may be used. The same applies to cosine signals.

In the present embodiment, the angle calculator 62 performs an angle calculation by using a sum of the first sine signal, the second sine signal, and the third sine signal, and a sum of a first cosine signal, a second cosine signal, and a third cosine signal. By using a sum of multiple signals of each type, angular errors caused by displacement from a rotation center C can be cancelled out. Also, because angular errors inherent to the respective sensing portions 20, 30, 40 are averaged, calculation accuracy of a mechanical angle Om can be increased further. Also, by using a sum of multiple signals of each type, influences of an abnormal signal given to an angle calculation immediately after the occurrence of the abnormality can be reduced in comparison with a case where the angle calculator 62 performs an angle calculation by using signals from any one of the sensing portions 20, 30, 40.

When the second sensing portion 30 is abnormal, the angle calculator 62 performs an angle calculation by using signals outputted from the first sensing portion 20 and signals outputted from the third sensing portion 40.

When the third sensing portion 40 is abnormal, the angle calculator 62 performs an angle calculation by using signals outputted from the first sensing portion 20 and signals outputted from the second sensing portion 30.

When the first sensing portion 20 is abnormal, the angle calculator 62 performs an angle calculation by using signals outputted from the second sensing portion 30 and signals outputted from the third sensing portion 40.

An abnormality monitoring unit 65 performs process in the same manner as in the first embodiment above.

In the present embodiment, when multiple sensing portions 20, 30, 40 are normal, the angle calculator 62 calculates the mechanical angle Om by using signals outputted from all of the normal sensing portions. By performing a calculation by using multiple signals, influences of angular errors given from the occurrence of an abnormality in the sensing portion to identification of the abnormality can be reduced.

In addition, advantages same as the advantages of the embodiments above can be achieved, too.

Sixth Embodiment

The following will describe a sixth embodiment of the present disclosure with reference to FIG. 16.

Contrary to the embodiments above in which the abnormality monitoring unit 65 identifies where an abnormality is occurring in each of the sensing portions 20, 30, 40, an abnormality monitoring unit 65 of the present embodiment identifies an abnormality in each signal. In FIG. 16, "ave_cos2, 3" means an average value of a second cosine signal and a third cosine signal, and "ave_sin2, 3" means an average value of a second sine signal and a third sine signal. The same applies to FIG. 17 and FIG. 18. As has been described above, using an average value is included in the concept of "using a sum".

In the present embodiment, a first sine signal and a first cosine signal, which are signals from a first sensing portion 20, are given as "center signals", and the second sine signal and the second cosine signal from a second sensing portion 30 and a third sine signal and the third cosine signal from a third sensing portion 40 are given as "non-center signals".

When the first cosine signal is normal, an angle calculator 62 performs an angle calculation by using the first cosine signal, which is the center signal, as a cosine signal. When the first cosine signal is abnormal, the angle calculator 62 performs an angle calculation by using at least one of the second cosine signal and the third cosine signal, which are the non-center signals, as the cosine signal.

In the present embodiment, when the first cosine signal is abnormal, the angle calculator 62 performs an angle calculation by using an average value of the second cosine signal and the third cosine signal as the cosine signal. As has been described in the first embodiment above, by using an average value of the second cosine signal and the third cosine signal, waveform distortions of output signals caused by positional displacement of the second sensing portion 30 and the third sensing portion 40 from a rotation center C can be cancelled each other out. As in the first embodiment above, for example, when the second sensing portion 30 and the third sensing portion 40 are disposed within an optimal field range, one of the second cosine signal and the third cosine signal may be used as the cosine signal. The same applies to sine signals.

When the first sine signal is normal, the angle calculator 62 performs an angle calculation by using the first sine signal, which is the center signal, as a sine signal. When the first sine signal is abnormal, the angle calculator 62 performs an angle calculation by using at least one of the second sine signal and the third sine signal, which are the non-center signals, as the sine signal.

In the present embodiment, when the first sine signal is abnormal, the angle calculator 62 performs an angle calculation by using an average value of the second sine signal and the third sine signal as the sine signal.

When all cosine signals are normal, the abnormality monitoring unit 65 monitors an abnormality of the cosine signals by performing calculations for three combinations to compare every two cosine signals. When one of the cosine signals is abnormal, the abnormality monitoring unit 65 continues to monitor an abnormality by comparing two normal cosine signals.

When all sine signals are normal, the abnormality monitoring unit 65 monitors an abnormality of the sine signals by performing calculations for three combinations to compare every two sine signals. When one of the sine signals is abnormal, the abnormality monitoring unit 65 continues to monitor an abnormality by comparing two normal sine signals.

Details of the monitoring of an abnormality are the same as the details described in the first embodiment above.

In the present embodiment, the abnormality monitoring unit 65 monitors an abnormality of each signal. Hence, although it is not shown in FIG. 16, even when a sine signal from one sensing portion and a cosine signal from another sensing portion are abnormal, for example, when the second sine signal and the third cosine signal are abnormal, as long as only one sine signal and only one cosine signal are abnormal, the angle calculation can be continued with accuracy as high as accuracy in properly operating state and monitoring of signals used for the calculation can be also continued.

In the present embodiment, the abnormality monitoring unit 65 monitors an abnormality in each signal outputted from the sensing portions 20, 30, 40. Consequently, even in the event of a second failure, the angle calculation can be continued and monitoring of signals used for the angle calculation can be also continued unless, for example, a failure occurs successively in sine signals or in cosine signals or the power supply is lost.

In addition, advantages same as the advantages of the embodiments above can be achieved, too.

Seventh Embodiment

The following will describe a seventh embodiment of the present disclosure with reference to FIG. 17.

In the present embodiment, an abnormality monitoring unit 65 identifies an abnormality in each signal as in the sixth embodiment above. Also, as in the second embodiment above, when a first sine signal, which is a center signal, is normal, the abnormality monitoring unit 65 chiefly monitors the first sine signal. Likewise, when a first cosine signal, which is also a center signal, is normal, the abnormality monitoring unit 65 chiefly monitors the first cosine signal. That is to say, when the first sine signal is normal, the abnormality monitoring unit 65 does not compare a second sine signal with a third sine signal. When the first cosine signal is normal, the abnormality monitoring unit 65 does not compare a second cosine signal with a third cosine signal, either. Consequently, a calculation load on the abnormality monitoring unit 65 can be reduced.

Details of abnormality monitoring process by the abnormality monitoring unit 65 are same as the details described in the second embodiment above, and details of angle calculation process by an angle calculator 62 are same as the details described in the sixth embodiment above.

Effects same as the advantages of the embodiments above can be also achieved when configured as above.

Eighth Embodiment

The following will describe an eighth embodiment of the present disclosure with reference to FIG. 18. The present embodiment is a modification of the sixth embodiment above.

In the sixth embodiment above, the first sine signal and the first cosine signal are given as the center signals and the second sine signal, the third sine signal, the second cosine signal, and the third cosine signal are given as the non-center signals. On the contrary, in the present embodiment, center signals are not set and an angle calculator 62 performs an angle calculation by using at least one of normal signals of each type as in the fifth embodiment above.

More specifically, when all of a first cosine signal, a second cosine signal, and a third cosine signal are normal, the angle calculator 62 performs an angle calculation by using at least one of the first cosine signal, the second cosine signal, and the third cosine signal.

When the second cosine signal is abnormal, the angle calculator 62 performs an angle calculation by using at least one of the first cosine signal and the third cosine signal.

When the third cosine signal is abnormal, the angle calculator 62 performs an angle calculation by using at least one of the first cosine signal and the second cosine signal.

When the first cosine signal is abnormal, the angle calculator 62 performs an angle calculation by using at least one of the second cosine signal and the third cosine signal.

The same applies to sine signals.

An abnormality monitoring unit 65 performs process in the same manner as in the sixth embodiment above.

Effects same as the advantages of the embodiments above can be also achieved when configured as above.

Ninth Embodiment

Figure 19:
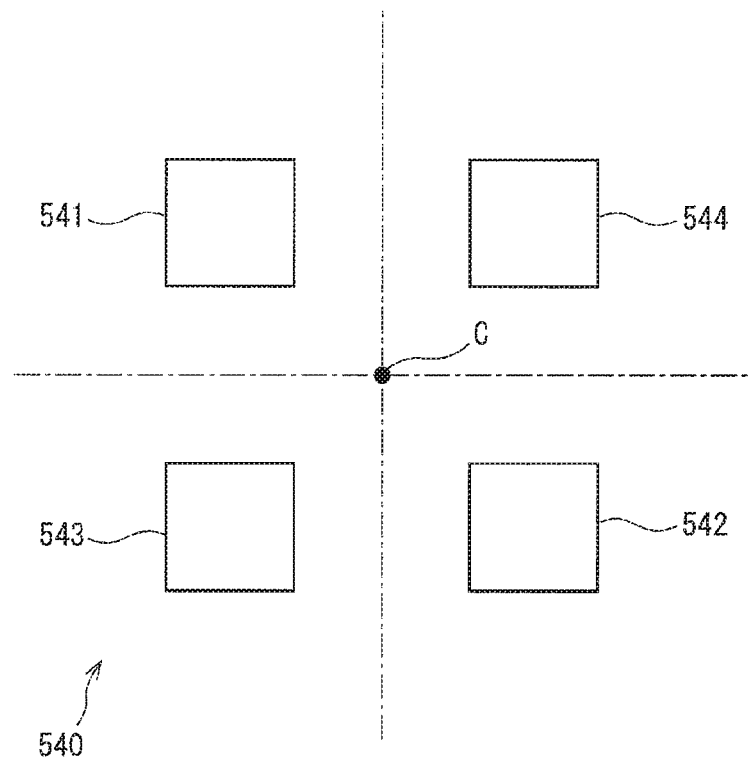
FIG. 19 is a diagram showing a schematic front view of a sensing portion arrangement according to a ninth embodiment of the present disclosure.
Figure 20:
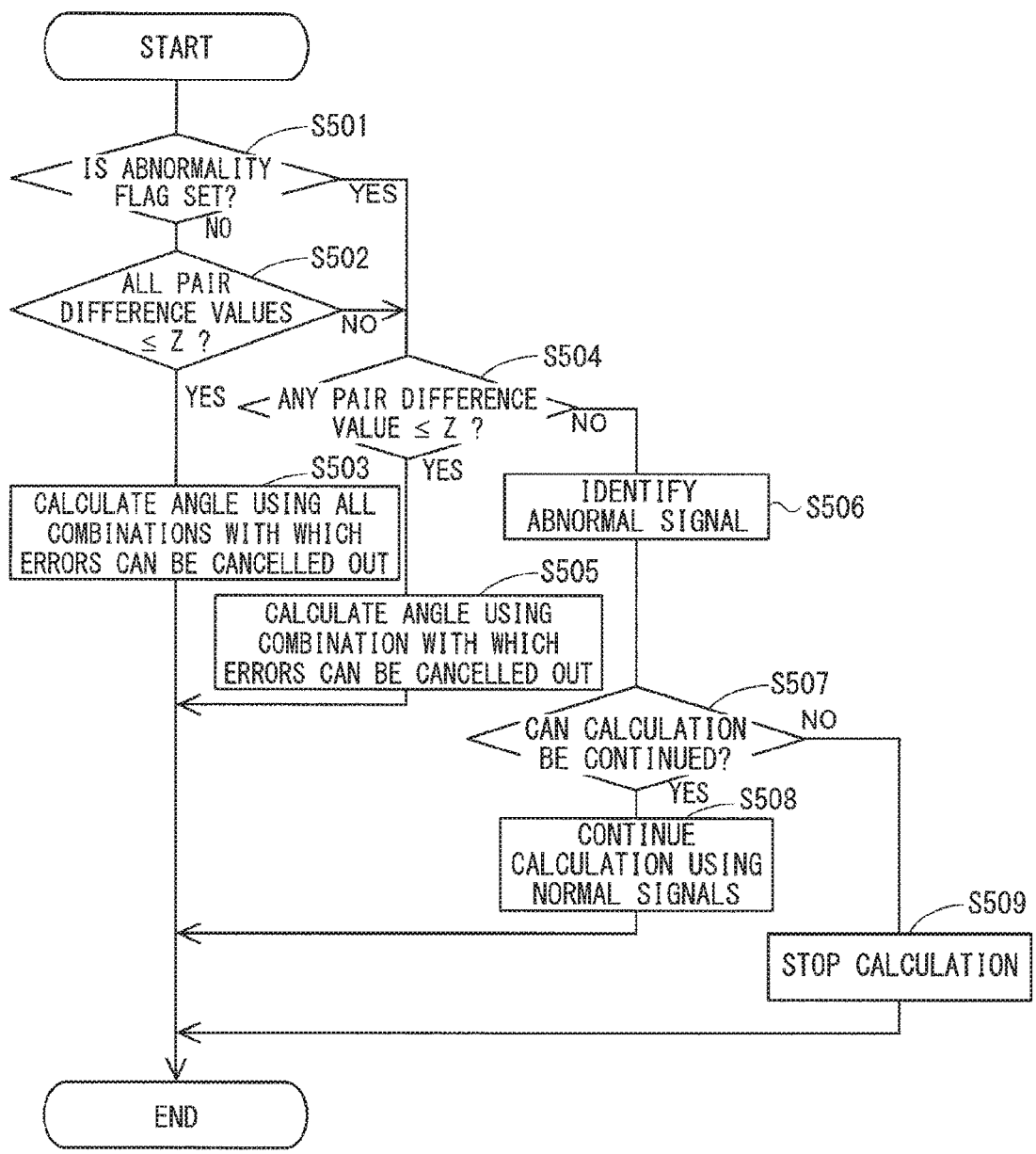
FIG. 20 is a flowchart showing an angle calculation process according to the ninth embodiment of the present disclosure.

The following will describe a ninth embodiment of the present disclosure with reference to FIG. 19 and FIG. 20.

The first embodiment through the eighth embodiment above have described a case where the three sensing portions 20, 30, 40 are included in the sensor unit 15. In the present embodiment, as is shown in FIG. 19, a sensor unit 540 includes four sensing portions 541 through 544. Although it is not shown in FIG. 19, the sensing portions 541 through 544 are sealed by a single sealing portion 16 as in the embodiments above. In addition, respective terminals are provided in such a manner that signal output terminals are not adjacent to each other and feed terminals and ground terminals are not adjacent to each other. A circuit configuration of the sensing portions 541 through 544 is same as the circuit configuration of the sensing portions 20, 30, 40 and a description is omitted herein. The same applies to sensor units 545, 550, 560, 570 in embodiments described below.

A first AD converter 611 converts signals from the sensing portions 541 and 542 from analog to digital and a second AD converter 612 converts signals from the sensing portions 543 and 544 from analog to digital. The signals can be converted from analog to digital in any order. In the embodiments described below, too, signals from the respective sensing portions are assigned to the AD converters 611 and 612 appropriately and converted from analog to digital.

Hereinafter, locations of the sensing portions 541 through 544 and angle calculation process will be chiefly described.

As is shown in FIG. 19, the four sensing portions 541 through 544 are disposed about a rotation center C to be equally distanced from the rotation center C. In the present embodiment, the sensing portion 541 and the sensing portion 542 are disposed point-symmetrically with respect to the rotation center C. Also, the sensing portion 543 and the sensing portion 544 are disposed point-symmetrically with respect to the rotation center C.

Hence, by using a sum of a sine signal from the sensing portion 541 and a sine signal from the sensing portion 542, waveform distortion components of output signals can be cancelled each other out. Also, by using a sum of a sine signal from the sensing portion 543 and a sine signal from the sensing portion 544, distortion components of output signals can be cancelled each other out. The same applies to cosine signals. In the present embodiment, the sensing portions 511 and 542 make up a symmetric sensing portion set. The sensing portions 543 and 544 make up another symmetric sensing portion set. Hereinafter, an absolute value of a deviation between the sine signals or the cosine signals from a symmetric sensing portion set is referred to as a pair difference value ΔPair.

When the sensing portions 541 through 544 are disposed as in FIG. 19, combinations (41) and (42) below are combinations with which errors caused by positional displacement from the rotation center C can be cancelled each other out.

(41) sensing portion 441+sensing portion 442
(42) sensing portion 443+sensing portion 444

Hence, by using either (41) or (42) or a sum of (41) and (42), distortion components of output signals are cancelled each other out and an angle calculation can be performed with high accuracy.

Herein, "sensing portion 541+sensing portion 542" means, for example, that an angle calculator 62 performs an angle calculation by using a sum of a sine signal from the sensing portion 541 and a sine signal from the sensing portion 542 and a sum of a cosine signal from the sensing portion 541 and a cosine signal from the sensing portion 542. When (41) and (42) are used, the angle calculator 62 performs a calculation, for example, by using a sum of sine signals from the sensing portions 541 through 544 and a sum of cosine signals from the sensing portions 541 through 544.

The same applies to (51) through (53), (61) through (63), and (71) through (74) described below.

Angle calculation process of the present embodiment will now be described in accordance with a flowchart of FIG. 20. The process is applicable when a sensing portion is not disposed on the rotation center C and a sensor unit includes a combination of sensing portions disposed point-symmetrically with respect to the rotation center C.

In S501, an abnormality monitoring unit 65 determines whether an abnormal flag described below is set. When the abnormal flag is determined as being set (S501: YES), the process proceeds to S504. When the abnormal flag is determined as not being set (S501: NO), the process proceeds to S502.

In S502, the abnormality monitoring unit 65 determines whether all of the pair difference values ΔPair are equal to or less than a determination threshold Z. When at least one of the pair difference values ΔPair is determined as being greater than the determination threshold Z (S502: NO), the abnormality flag is set and the process proceeds to S504. When all of the pair difference values ΔPair are determined as being equal to or less than the determination threshold Z (S502: YES), the process proceeds to S503.

In S503, the angle calculator 62 performs an angle calculation by using all sets with which errors can be cancelled each other out. However, the angle calculator 62 may perform an angle calculation by using at least one set with which errors can be cancelled each other out.

In S504 to which advancement is made when the abnormality flag is set (S501: YES) or when at least one of the pair difference values ΔPair is determined as being greater than the determination threshold Z (S502: NO), the abnormality monitoring unit 65 determines whether a symmetric sensing portion set having a pair difference value ΔPair equal to or less than the determination threshold Z is present. When absence of a symmetric sensing portion set having a pair difference value ΔPair equal to or less than the determination threshold Z is determined (S504: NO), the process proceeds to S506. When presence of a symmetric sensing portion set having a pair difference value ΔPair equal to or less than the determination threshold Z is determined (S504: YES), the process proceeds to S505.

In S505, the angle calculator 62 performs an angle calculation by using the symmetric sensing portion having a pair difference value ΔPair equal to or less than the determination threshold Z. When more than one symmetric sensing portion sets are present, the angle calculator 62 may use a sum of a combination of two or more sets or any one of multiple sets.

In S506 to which advancement is made when the absence of a symmetric sensing portion set having a pair difference value ΔPair equal to or less than the determination threshold Z is determined (S504: NO), the abnormality monitoring unit 65 identifies an abnormal signal. More specifically, the abnormality monitoring unit 65 calculates signal deviations other than the pair difference values ΔPair and compares the signal deviations with the determination threshold Z, and identifies an abnormal signal according to a comparison result. Details of the abnormal signal identification are same as the details described in the embodiments above.

In S507, the abnormality monitoring unit 65 determines whether the angle calculation can be continued. In the present embodiment, it is determined that the angle calculation can be continued when at least two sensing portions are normal. When it is determined that the angle calculation can be continued (S507: YES), the process proceeds to S508. When it is determined that the angle calculation can no longer be continued (S507: NO), the process proceeds to S509.

Processing in S508 and S509 is same as the process in S306 and S307 of FIG. 13 described in the third embodiment above.

In the present embodiment, distortion components of output signals can be cancelled each other out by an angle calculation performed by the angle calculator 62 using a sum of signals of each type from the sensing portions disposed point-symmetrically, that is, a combination with which errors can be cancelled each other out. An angle calculation can be thus performed with high accuracy.

Also, while the combination with which errors can be canceled each other out is normal, the abnormality monitoring unit 65 monitors an abnormality according to a pair difference value ΔPair. Hence, a calculation load can be reduced.

In addition, advantages same as the advantages of the embodiments above can be achieved, too.

Tenth Embodiment

Figure 21A:
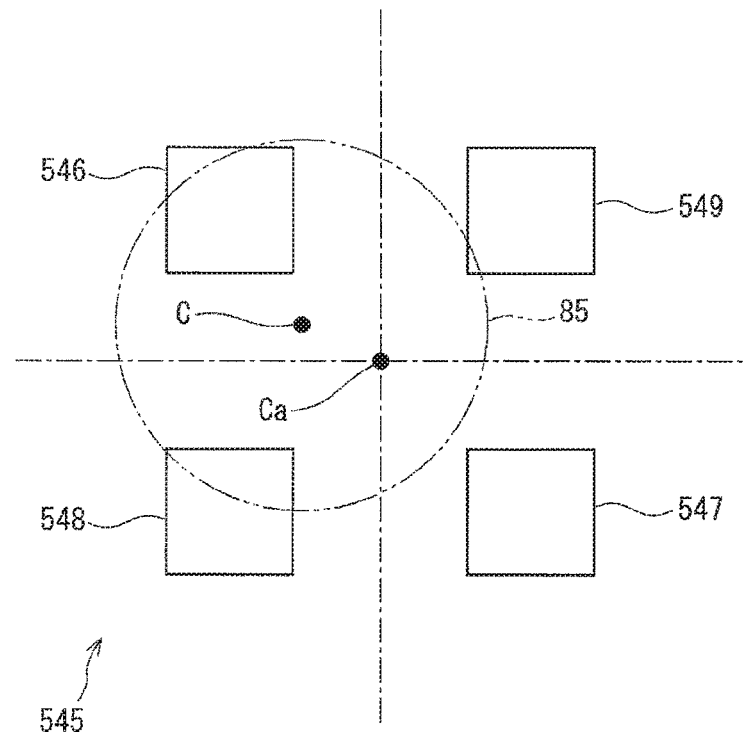
FIG. 21A is diagram showing a schematic front view of a sensing portion arrangement according to a tenth embodiment of the present disclosure.
Figure 21B:
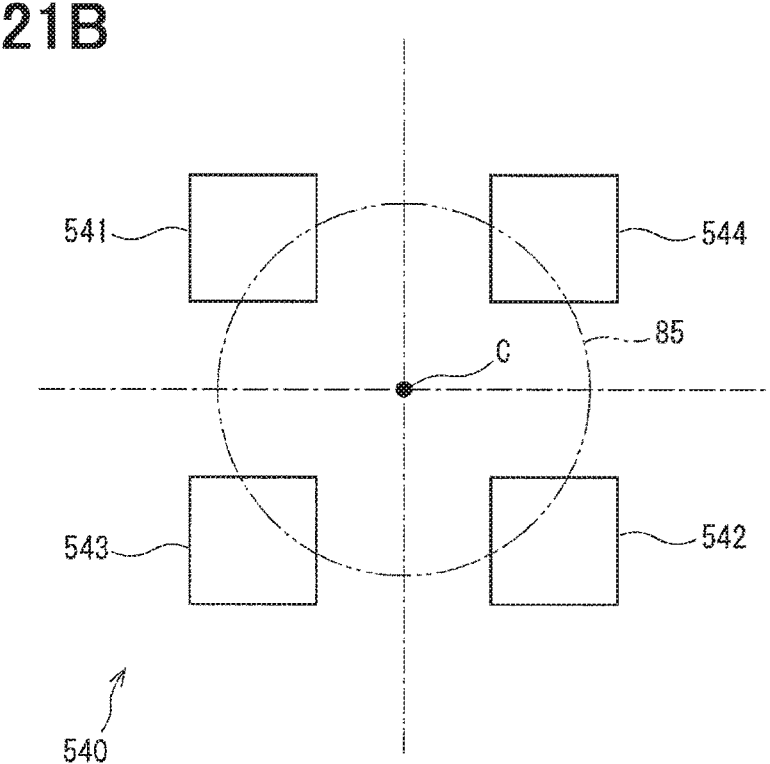
FIG. 21B is a diagram showing a schematic view of a sensing portion arrangement according to the ninth embodiment for comparison with FIG. 21A.

A tenth embodiment of the present disclosure is shown in FIG. 21A. FIG. 21A shows a sensor unit 545 of the present embodiment. FIG. 21B shows the sensor unit 540 of the ninth embodiment above.

As is shown in FIG. 21A, the sensor unit 545 includes four sensing portions 546 through 549.

In the sensor unit 545 of the ninth embodiment above shown in FIG. 21B, the sensing portion 541 and the sensing portion 542 and also the sensing portions 543 and the sensing portions 544 are disposed point-symmetrically with respect to the rotation center C that falls on a center of a magnet 85. Hence, distortion components of output signals can be cancelled out by performing an angle calculation by using a sum of signals of each type.

On the contrary, in the present embodiment, a symmetric center Ca of the sensing portions 546 through 549 is different from the rotation center C as is shown in FIG. 21A. In other words, the sensing portions 546 through 549 are not disposed point-symmetrically with respect to the rotation center C. Hence, distortion components of output signals from the sensing portions 546 through 549 cannot be cancelled out completely. However, by using a sum of the four signals of each type, angular errors involved in calculation can be reduced in comparison with a case where an angle calculator 62 performs an angle calculation, for example, according to signals only from the sensing portion 547 remotest from the rotation center C. Hence, in the present embodiment, when all of the four sensing portions 546 through 549 are normal, the angle calculator 62 performs an angle calculation by using signals from all of the normal sensing portions 546 through 549. Consequently, an angular error can be reduced in comparison with a case under worst conditions and robustness against positional displacement can be increased. In addition, influences of an angular error from the occurrence of an abnormality in any one of the sensing portions to identification of the abnormality can be reduced.

An abnormality monitoring unit 65 is capable of identifying an abnormal signal according to comparison results of two signal deviations and a determination threshold Z as in the embodiments above.

In addition, advantages same as the advantages of the above embodiments can be achieved, too.

Eleventh Embodiment

Figure 22:
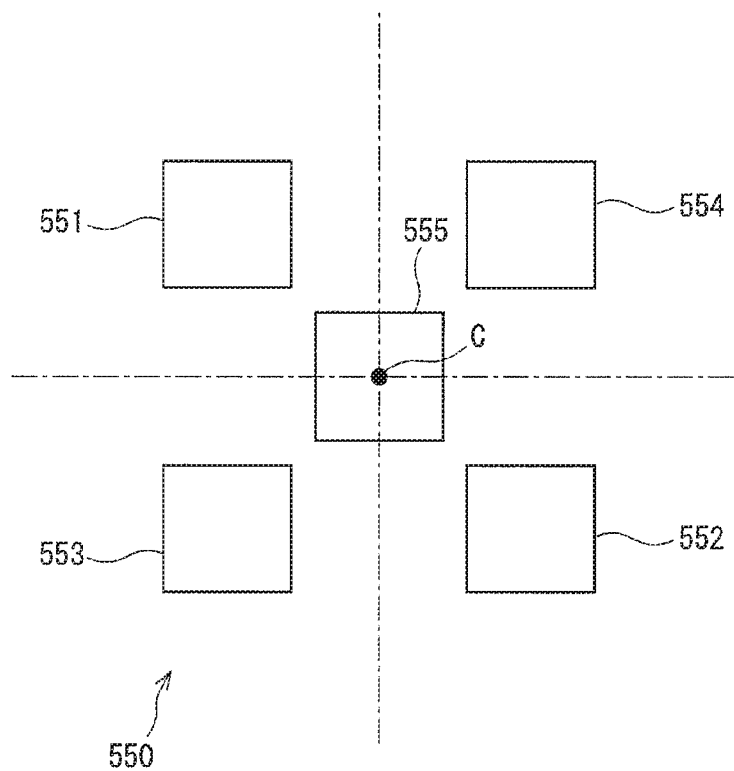
FIG. 22 is a diagram showing a schematic front view of a sensing portion arrangement according to an eleventh embodiment of the present disclosure.
Figure 23:
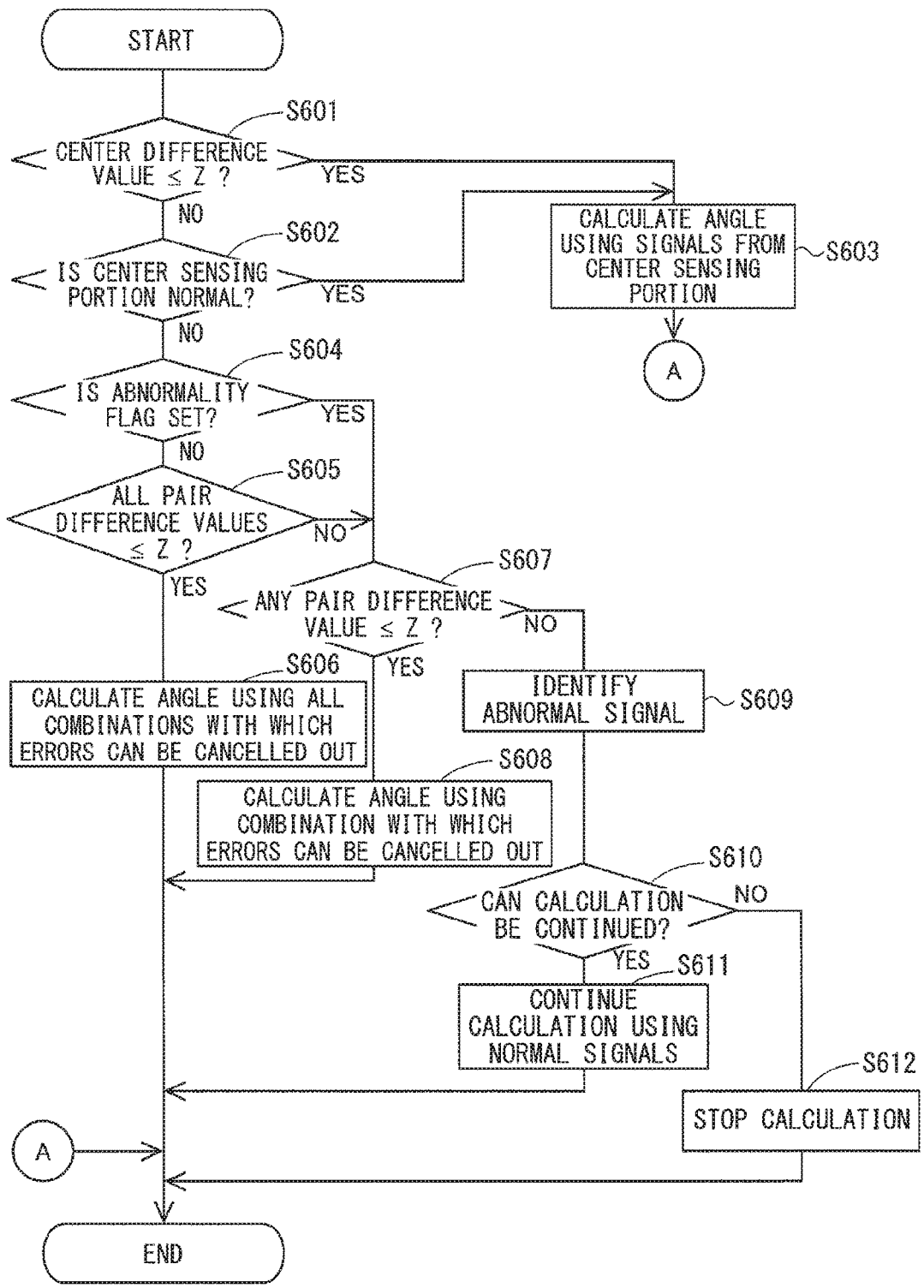
FIG. 23 is a flowchart showing an angle calculation process according to the eleventh embodiment of the present disclosure.

The following will describe an eleventh embodiment of the present disclosure with reference to FIG. 22 and FIG. 23.

As is shown in FIG. 22, a sensor unit 550 of the present embodiment includes five sensing portions 551 through 555. As with the sensing portions 541 through 544 of the ninth embodiment above, the four sensing portions 551 through 554 are disposed about a rotation center C to be equally distanced from the rotation center C. The sensing portion 551 and the sensing portion 552 are disposed point-symmetrically with respect to the rotation center C. Also, the sensing portion 553 and the sensing portion 554 are disposed point-symmetrically with respect to the rotation center C. In other words, the sensing portions 551 and 552 and the sensing portions 553 and 554 make up "sets of symmetric sensing portions" with which detection errors caused by positional displacement from the rotation center C can be cancelled each other out.

The sensing portion 555 is disposed with a center falling on the rotation center C as with the first sensing portion 20 of the first embodiment or the like above. Hereinafter, the sensing portion 555 disposed on the rotation center C is given as "a center sensing portion". A difference value of a deviation between a signal from the sensing portion 555 and a signal from any of the other sensing portions 551 through 554 is given as a center difference value Δcnt.

When the sensing portions 551 through 555 are disposed as shown in FIGS. 22, (51), (52), and (53) below are combinations with which errors caused by positional displacement from the rotation center C can be cancelled each other out. Hence, by using any one of (51) through (53) or using a sum of two or more of (51) through (53), distortion components of output signals can be cancelled out. An angle calculation can be thus performed with high accuracy.

(51) sensing portion 551+sensing portion 552
(52) sensing portion 553+sensing portion 554
(53) sensing portion 555

In the present embodiment, when the sensing portion 555 is normal, an angle calculator 62 performs an angle calculation preferentially using signals from the sensing portion 555.

The following will describe an angle calculation process of the present embodiment in accordance with a flowchart of FIG. 23. The process is applicable when a sensing portion is disposed on the rotation center C.

In S601, an abnormality monitoring unit 65 determines whether center difference values Δcnt between the sensing portion 555 and the other sensing portions 551 through 554 are equal to or less than a determination threshold Z. Herein, the abnormality monitoring unit 65 compares deviations between signals from at least two of the sensing portions 551 through 554 and signals from the sensing portion 555 with the determination threshold Z. When all of the calculated center difference values Δcnt are determined as being equal to or less than the determination threshold Z (S601: YES), the process proceeds to S603. When at least one of the center difference values Δcnt is determined as being greater than the determination threshold Z (S601: NO), the process proceeds to S602.

In S602, the abnormality monitoring unit 65 determines whether the sensing portion 555 is normal. When the sensing portion 555 is determined as not being normal (S602: NO), the process proceeds to S604. When the sensing portion 555 is determined as being normal (S602: YES), the process proceeds to S603.

In S603, the angle calculator 62 performs an angle calculation by using signals from the sensing portion 555.

Processing in S604 through S612 is same as the process in S501 through S509 of FIG. 20 described in the ninth embodiment above.

Effects same as the advantages of the embodiments above can be also achieved when configured as above.

Twelfth Embodiment

Figure 24:
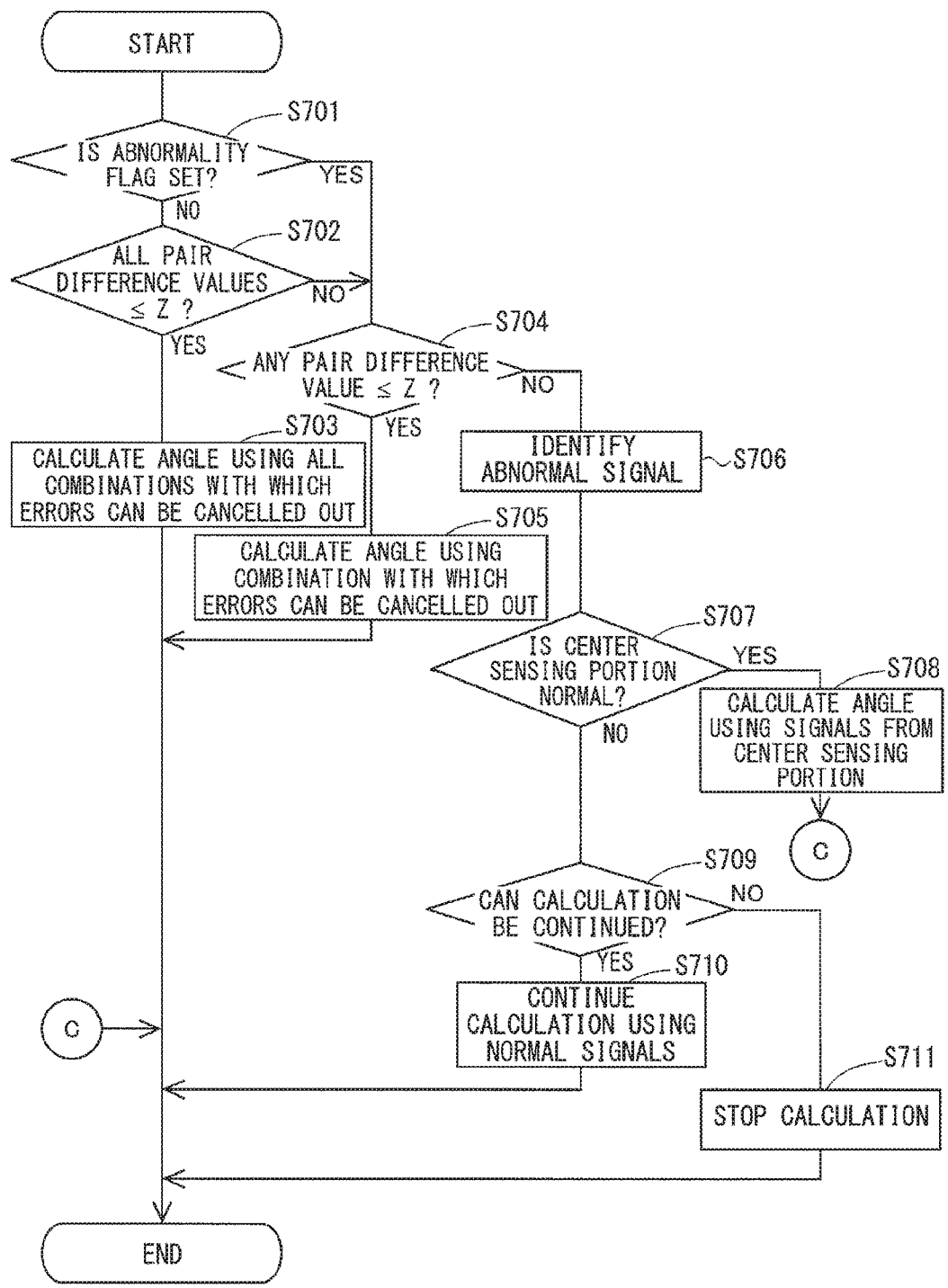
FIG. 24 is a flowchart showing an angle calculation process according to a twelfth embodiment of the present disclosure.

The following will describe a twelfth embodiment of the present disclosure with reference to FIG. 24.

The present embodiment is same as the eleventh embodiment above except for angle calculation process. Contrary to the eleventh embodiment above in which a priority is given to the sensing portion 555 disposed on the rotation center C, an angle calculator 62 of the present embodiment performs an angle calculation by preferentially using a combination of sensing portions disposed point-symmetrically with respect to a rotation center C (that is, the combinations (51) and (52) described in the eleventh embodiment above).

Processing in S701 through S706 is same as the process in S501 through S506 of FIG. 20 described in the ninth embodiment above. On the condition that the sensing portion 555 is normal, signals from the sensing portion 555 may be added to signals used for an angle calculation in S703 and S705.

In S707 following S706, an abnormality monitoring unit 65 determines whether the sensing portion 555 is normal. When the sensing portion 555 is determined as not being normal (S707: NO), the process proceeds to S709. When the sensing portion 555 is determined as being normal (S707: YES), the process proceeds to S708.

Processing in S708 is same as the process in S603 of FIG. 23 described in the eleventh embodiment above.

Processing in S709 through S711 is same as the process in S507 through S509 of FIG. 20 described in the ninth embodiment above.

Effects same as the advantages of the embodiments above can be also achieved when configured as above.

Thirteenth Embodiment

Figure 25:
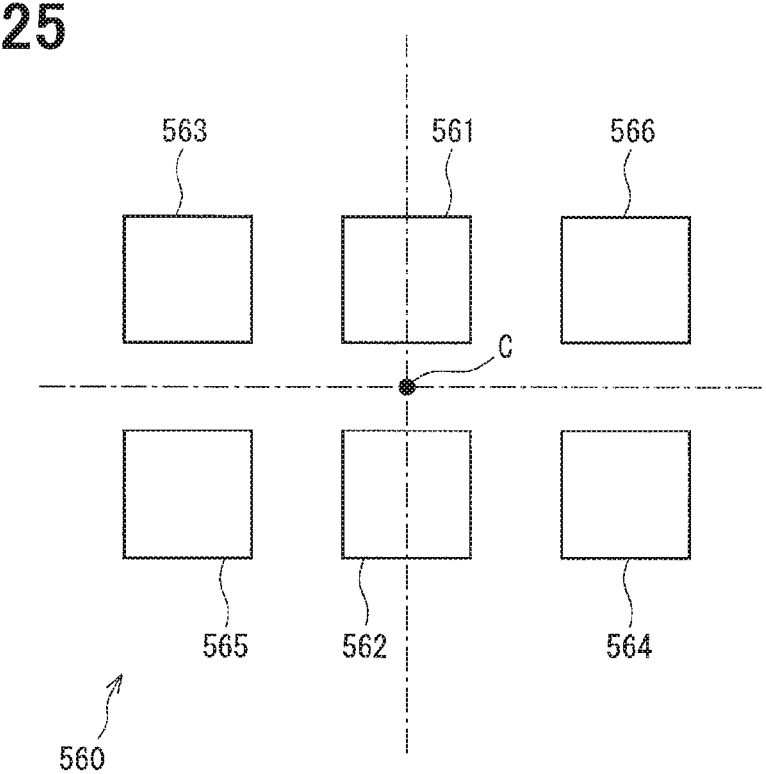
FIG. 25 is a diagram showing a schematic front view of a sensing portion arrangement according to a thirteenth embodiment of the present disclosure.

The following will describe a thirteenth embodiment of the present disclosure with reference to FIG. 25.

As is shown in FIG. 25, a sensor unit 560 of the present embodiment includes six sensing portions 561 through 566. The sensing portion 561 and the sensing portion 562 are disposed point-symmetrically with respect to a rotation center C and so are the sensing portion 563 and the sensing portion 564 and also the sensing portion 565 and the sensing portion 566. In other words, the sensing portions 561 and 562, the sensing portions 563 and 564, and the sensing portions 565 and 566 make up "sets of symmetrical sensing portions" and combinations with which errors caused by positional displacement from the rotation center C can be cancelled each other out are (61) through (63) as follows.

(61) sensing portion 561+sensing portion 562
(62) sensing portion 563+sensing portion 564
(63) sensing portion 565+sensing portion 566

Hence, by using any one of (61) through (63) or a sum of at least two of (61) through (63), distortion components of output signals are cancelled each other out. An angle calculation can be thus performed with high accuracy.

Abnormality monitoring and an angle calculation can be performed in accordance with the flowchart of FIG. 20 described in the ninth embodiment above.

Effects same as the advantages of the embodiments above can be also achieved when configured as above.

Fourteenth Embodiment

Figure 26:
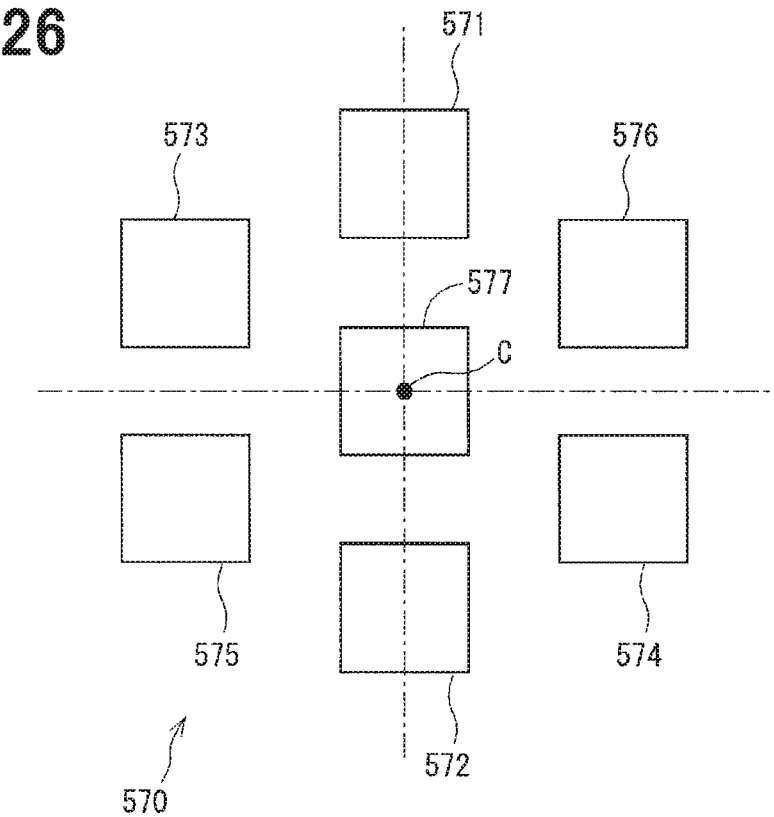
FIG. 26 is a diagram showing a schematic front view of a sensing portion arrangement according to a fourteenth embodiment of the present disclosure.

The following will describe a fourteenth embodiment of the present disclosure with reference to FIG. 26.

As is shown in FIG. 26, a sensor unit 570 of the present embodiment includes seven sensing portions 571 through 577. The sensing portions 571 and the sensing portion 572 are disposed point-symmetrically with respect to a rotation center C and so are the sensing portion 573 and the sensing portion 574 and also the sensing portion 575 and the sensing portion 576. In other words, the sensing portions 571 and 572, the sensing portions 573 and 574, and the sensing portions 575 and 576 make up "sets of symmetric sensing portions".

In addition, the sensing portion 577 is disposed with a center falling on the rotation center C as with the sensing portion 555 of the eleventh embodiment described above. In short, in the present embodiment, the senor portion 577 is "a center sensing portion".

In the present embodiment, combinations with which errors caused by positional displacement from the rotation center C can be cancelled each other out are (71) through (74) below. Hence, by using any one of (71) through (74) or a sum of at least two of (71) through (74), distortion components of output signals are cancelled each other out. An angle calculation can be thus performed with high accuracy.

(71) sensing portion 571+sensing portion 572
(72) sensing portion 573+sensing portion 574
(73) sensing portion 575+sensing portion 576
(74) sensing portion 577

Abnormality monitoring and an angle calculation can be performed in accordance with the flowchart of FIG. 23 described in the eleventh embodiment above or FIG. 24 described in the twelfth embodiment above.

Effects same as the advantages of the embodiments above can be also achieved when configured as above.

Other Embodiments

In the embodiments above, the sine circuit units of the respective sensing portions are configured in the same manner and the sine signals outputted from the sine circuit units have equal amplitudes. In other embodiments, the sine signals outputted from the sine circuit units of the respective sensing portions may have different amplitudes. Herein, amplitudes may be corrected by changing a gain in the differential amplifier according to the amplitude or amplitudes may be corrected by a calculation in the controller. The same applies to the cosine signals outputted from the cosine circuit units.

In the embodiments above, the main signal outputted from the main circuit unit is the sine signal and the subsidiary signal outputted from the subsidiary circuit unit is the cosine signal, and the main signal and the subsidiary signal are 90° out of phase with each other. In the other embodiments, a phase difference is not limited to 90° and it is sufficient that a main positive signal and a main negative signal outputted from the main circuit unit and a subsidiary positive signal and a subsidiary negative signal outputted from the subsidiary circuit unit are out of phase with each other. The angle calculator is capable of calculating a rotation angle of the detection target as long as the main positive signal and the main negative signal and the subsidiary positive signal and the subsidiary negative signal are out of phase with each other.

At least one of the main differential amplifier and the sub differential amplifier may be provided separately from the sensing portion or may be omitted. In the embodiments above, the positive sine signal is inputted into the plus input terminal of the sine differential amplifier and the negative sine signal is inputted into the minus input terminal. Also, the positive cosine signal is inputted into the plus input terminal of the cosine differential amplifier and the negative cosine signal is inputted into the minus input terminal. In the other embodiments, the negative sine signal may be inputted into the plus input terminal of the sine differential amplifier and the positive sine signal may be inputted into the minus input terminal. Likewise, the negative cosine signal may be inputted into the plus input terminal of the cosine differential amplifier and the positive cosine signal may be inputted into the minus input terminal.

In the first embodiment above, the first sensing portion is disposed at the center between the second sensing portion and the third sensing portion, and the second sensing portion and the third sensing portion are disposed point-symmetrically with respect to the first sensing portion. In the other embodiments, the second sensing portion and the third sensing portion may not be disposed point-symmetrically with respect to the first sensing portion. Alternatively, the second sensing portion or the third sensing portion may be disposed at the center instead of the first sensing portion. Further, the first sensing portion, the second sensing portion, and the third sensing portion may be disposed in any manner.

In the embodiments above, the first sensing portion is disposed in such a manner that the center is on the center line of a rotating magnetic field of the detection target. In the other embodiments, the first sensing portion may be disposed in such a manner that the center is on a point other than the center line of a rotating magnetic field of the detection target.

The embodiments above have described cases where three to seven sensing portions are included. However, eight or more sensing portions may be included. In the embodiments above, when an odd number of sensing portions are included, one sensing portion is disposed on the center line and the remaining even number of sensing portions are disposed point-symmetrically with respect to the rotation center. When an even number of sensing portions are included, no sensing portion is disposed on the center line and the sensing portions are disposed point-symmetrically with respect to the rotation center. In the other embodiments, when an even number of sensing portions are included, the sensing portions may be disposed in any manner and one sensing portion may be disposed, for example, on the center line. It is, however, preferable to perform an angle calculation by using signals of a combination with which influences of positional displacement from the rotation center can be cancelled each other out.

In the embodiments above, the analogue to digital conversion circuit includes two AD converters. In the other embodiments, the analogue to digital conversion circuit may include one AD converter or three or more AD converters. Signals may be converted in the AD converters in order different from the orders specified in the embodiments above.

In the embodiments above, all of the sensing portions are sealed by a single sealing portion and the sensor unit forms a single package. In the other embodiments, the sensor unit may form multiple packages.

In the embodiments above, the signal output terminals are arranged so as not to be adjacent to each other. In the other embodiments, at least a part of the signal output terminals may be arranged adjacently to each other. In the embodiments above, the feed terminals and the ground terminals are arranged so as not to be adjacent to each other. In the other embodiments, at least a part of the feed terminals and the ground terminals may be arranged adjacently to each other.

In the embodiments above, the feed portion is provided for each sensing portion. In the other embodiments, a single feed portion may be provided for multiple sensing portions.

In the embodiments above, the controller and the sensing portions are included in the same substrate but mounted on opposite surfaces. In the other embodiments, the controller and the sensing portions may be mounted on the same surface of one substrate, or the controller may be provided to a portion different from the substrate on which the sensing portions are mounted. The same applies to the power supply IC.

In the embodiments above, the rotation angle detection apparatus is applied to the electric power steering apparatus. In the other embodiments, the rotation angle detection apparatus may be applied to apparatuses other than the electric power steering apparatus.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

What is claimed is:

1. A rotation angle detection apparatus comprising:
   three or more sensing portions; and
   a controller, wherein
   each of the three or more sensing portions includes a main circuit unit and a subsidiary circuit unit,
   the main circuit unit is provided by a full bridge circuit and outputs a main positive signal and a main negative signal as output signals, the main positive signal corresponds to a rotating magnetic field which changes corresponding to a rotation of a detection target, and the main negative signal has an inverted polarity relative to a polarity of the main positive signal,
   the subsidiary circuit unit is provided by a full bridge circuit and outputs a subsidiary positive signal and a subsidiary negative signal as output signals, the subsidiary positive signal corresponds to the rotating magnetic field which changes corresponding to the rotation of the detection target, the subsidiary positive signal has a different phase from the main positive signal, and the subsidiary negative signal has an inverted polarity relative to a polarity of the subsidiary positive signal,
   the controller includes an angle calculator and an abnormality monitoring unit,
   the angle calculator calculates a rotation angle of the detection target based on a main signal and a subsidiary signal, the main signal corresponds to at least one of the main positive signal or the main negative signal outputted from the main circuit unit, and the subsidiary signal corresponds to at least one of the subsidiary positive signal or the subsidiary negative signal outputted from the subsidiary circuit unit, and
   the abnormality monitoring unit monitors an abnormality occurrence by comparing the corresponding output signals outputted from the three or more sensing portions.

2. The rotation angle detection apparatus according to claim 1, wherein
   at least one of the three or more sensing portions is disposed at a position which cancels a detection error caused by a positional displacement from a rotation center, and the rotation center is a center of the rotating magnetic field of the detection target.

3. The rotation angle detection apparatus according to claim 2, wherein
   two of the three or more sensing portions are disposed point-symmetrically with respect to the rotation center.

4. The rotation angle detection apparatus according to claim 3, wherein
   a combination of the two of the three or more sensing portions disposed point-symmetrically with respect to the rotation center configures a symmetric sensing portion set,
   when the output signals from the symmetric sensing portion set are normal, the angle calculator calculates the rotation angle by using the normal output signals from the symmetric sensing portion set, and
   the abnormality monitoring unit monitors the abnormality occurrence according to a comparison result of the output signals from the two of the three or more sensing portions disposed point-symmetrically with respect to the rotation center.

5. The rotation angle detection apparatus according to claim 2, wherein
   one of the three or more sensing portions is disposed on a center line of the rotating magnetic field of the detection target.

6. The rotation angle detection apparatus according to claim 5, wherein
   the one of the three or more sensing portions disposed on the center line of the rotating magnetic field of the detection target is provided as a center sensing portion,
   the abnormality monitoring unit monitors the abnormality occurrence according to a comparison result of the output signals from the center sensing portion with the output signals from the remaining sensing portions other than the center sensing portion, when the output signals from the center sensing portion are normal, the angle calculator calculates the rotation angle using the output signals from the center sensing portion, and, when the output signals from the center sensing portion are abnormal and the output signals from the symmetric sensing portion set, which is the combination of the two of the three or more sensing portions disposed point-symmetrically with respect to the rotation center, are normal, the angle calculator calculates the rotation angle using the output signals from the symmetric sensing portion set.

7. The rotation angle detection apparatus according to claim 1, wherein the three or more sensing portions are provided with respective feed portions, and each of the three or more sensing portions is supplied with power from the corresponding feed portion.

8. The rotation angle detection apparatus according to claim 1, further comprising a sealing portion sealing the three or more sensing portions; and a terminal portion protruding from the sealing portion, wherein the terminal portion includes a plurality of signal output terminals, a plurality of feed terminals, and a plurality of ground terminals, the plurality of signal output terminals output the output signals from each of the main circuit units or from each of the subsidiary circuit units, the plurality of feed terminals feed power to the three or more sensing portions, respectively, and the plurality of ground terminals connect the three or more sensing portions to a ground.

9. The rotation angle detection apparatus according to claim 8, wherein one of the plurality of remaining terminals except the plurality of signal output terminals is disposed between adjacent two of the plurality of signal output terminals.

10. The rotation angle detection apparatus according to claim 8, wherein one of the plurality of remaining terminals except the plurality of feed terminals is disposed between every two of the plurality of feed terminals, and one of the plurality of remaining terminals except the plurality of ground terminals is disposed between every two of the plurality of ground terminals.

11. The rotation angle detection apparatus according to claim 1, wherein the main positive signal is a positive sine signal, the main negative signal is a negative sine signal, the subsidiary positive signal is a positive cosine signal which is out of phase from the positive sine signal by 90 degrees, and the subsidiary negative signal is a negative cosine signal.

12. The rotation angle detection apparatus according to claim 1, wherein the controller includes an analogue to digital conversion circuit that performs an analog to digital conversion to each of the main signals and the subsidiary signals.

13. The rotation angle detection apparatus according to claim 12, wherein the analogue to digital conversion circuit includes a plurality of analogue to digital converters, and each of the analogue to digital converters performs an analog to digital conversion to at least one of the main signals and at least one of the subsidiary signals.

14. The rotation angle detection apparatus according to claim 13, wherein the three or more sensing portions include a first sensing portion, a second sensing portion, and a third sensing portion, the plurality of analogue to digital converters include a first analogue to digital converter and a second analogue to digital converter, the first analogue to digital converter and the second analogue to digital converter obtain signals and output signals at synchronized times, the first analogue to digital converter performs an analog to digital conversion to one of the main signal and the subsidiary signal outputted from the first sensing portion, and further performs an analog to digital conversion to the main signal and the subsidiary signal outputted from the second sensing portion, the second analogue to digital converter performs an analog to digital conversion to the remaining one of the main signal and the subsidiary signal outputted from the first sensing portion, and further performs an analog to digital conversion to the main signal and the subsidiary signal outputted from the third sensing portion, the first analogue to digital converter performs the analog to digital conversion in order of one of the main signal and the subsidiary signal outputted from the second sensing portion, the one of the main signal and the subsidiary signal outputted from the first sensing portion, and the remaining one of the main signal and the subsidiary signal outputted from the second sensing portion, the second analogue to digital converter performs the analog to digital conversion in order of one of the main signal and the subsidiary signal outputted from the third sensing portion, the remaining one of the main signal and the subsidiary signal outputted from the first sensing portion, and the remaining one of the main signal and the subsidiary signal outputted from the third sensing portion, and, in the analog to digital conversion performed by second analogue to digital converter, the one of the main signal and the subsidiary signal outputted from the third sensing portion and converted at first has a different type from the one of the main signal and the subsidiary signal outputted from the second sensing portion and converted at first in the analog to digital conversion performed by the first analogue to digital converter.

* * * * *